United States Patent
Bitto et al.

(10) Patent No.: US 11,125,596 B2
(45) Date of Patent: Sep. 21, 2021

(54) VIBRONIC MEASURING SYSTEM FOR MEASURING A MASS FLOW RATE

(71) Applicant: ENDRESS+HAUSER FLOWTEC AG, Reinach (CH)

(72) Inventors: Ennio Bitto, Aesch (CH); Christof Huber, Bern (CH); Alfred Rieder, Landshut (DE)

(73) Assignee: ENDRESS+HAUSER FLOWTEC AG, Reinach (CH)

( * ) Notice: Subject to any disclaimer, the term of this patent is extended or adjusted under 35 U.S.C. 154(b) by 0 days.

(21) Appl. No.: 16/474,719

(22) PCT Filed: Nov. 22, 2017

(86) PCT No.: PCT/EP2017/080095
§ 371 (c)(1),
(2) Date: Jun. 28, 2019

(87) PCT Pub. No.: WO2018/121930
PCT Pub. Date: Jul. 5, 2018

(65) Prior Publication Data
US 2020/0124452 A1    Apr. 23, 2020

(30) Foreign Application Priority Data

Dec. 29, 2016   (DE) ..................... 10 2016 015 657.0
Mar. 22, 2017   (DE) ..................... 10 2017 106 211.4

(51) Int. Cl.
*G01F 1/78*      (2006.01)
*G01F 1/74*      (2006.01)
(Continued)

(52) U.S. Cl.
CPC .................. *G01F 1/78* (2013.01); *G01F 1/74* (2013.01); *G01F 1/845* (2013.01); *G01F 1/8409* (2013.01);
(Continued)

(58) Field of Classification Search
CPC ........ G01F 1/84; G01F 1/8436; G01F 1/8477; G01F 1/8409; G01F 1/8413;
(Continued)

(56) References Cited

U.S. PATENT DOCUMENTS 4,768,384 A * 9/1988 Flecken ................ G01F 1/8495
73/861.02
5,381,697 A * 1/1995 van der Pol .......... G01F 1/8409
73/861.356
(Continued)

FOREIGN PATENT DOCUMENTS

CN          1946990 A      4/2007
CN          102713532 A    10/2012
(Continued)

OTHER PUBLICATIONS

German Search Report, German PTO, Munich, dated Sep. 28, 2017.
(Continued)

*Primary Examiner* — Jonathan M Dunlap
(74) *Attorney, Agent, or Firm* — Bacon & Thomas, PLLC

(57) ABSTRACT

A measuring system includes a measuring and operation electronic unit (ME) and a transducer device electrically coupled thereto. The transducer device (MW) has at least one tube, through which fluid flows during operation and which is caused to vibrate meanwhile, a vibration exciter, two vibration sensors for generating vibration signals, and two temperature sensors for generating temperature measurement signals (θ1, θ2). The temperature sensors are coupled to a wall of the tube in a thermally conductive manner. The ME is designed to feed electrical power into the at least one vibration exciter to cause mechanical vibrations of the tube by an electrical excitation signal. The ME generates a mass flow sequence representing the instantaneous mass flow rate (m) of the fluid, so that, at least for a (Continued)

Figure 1:
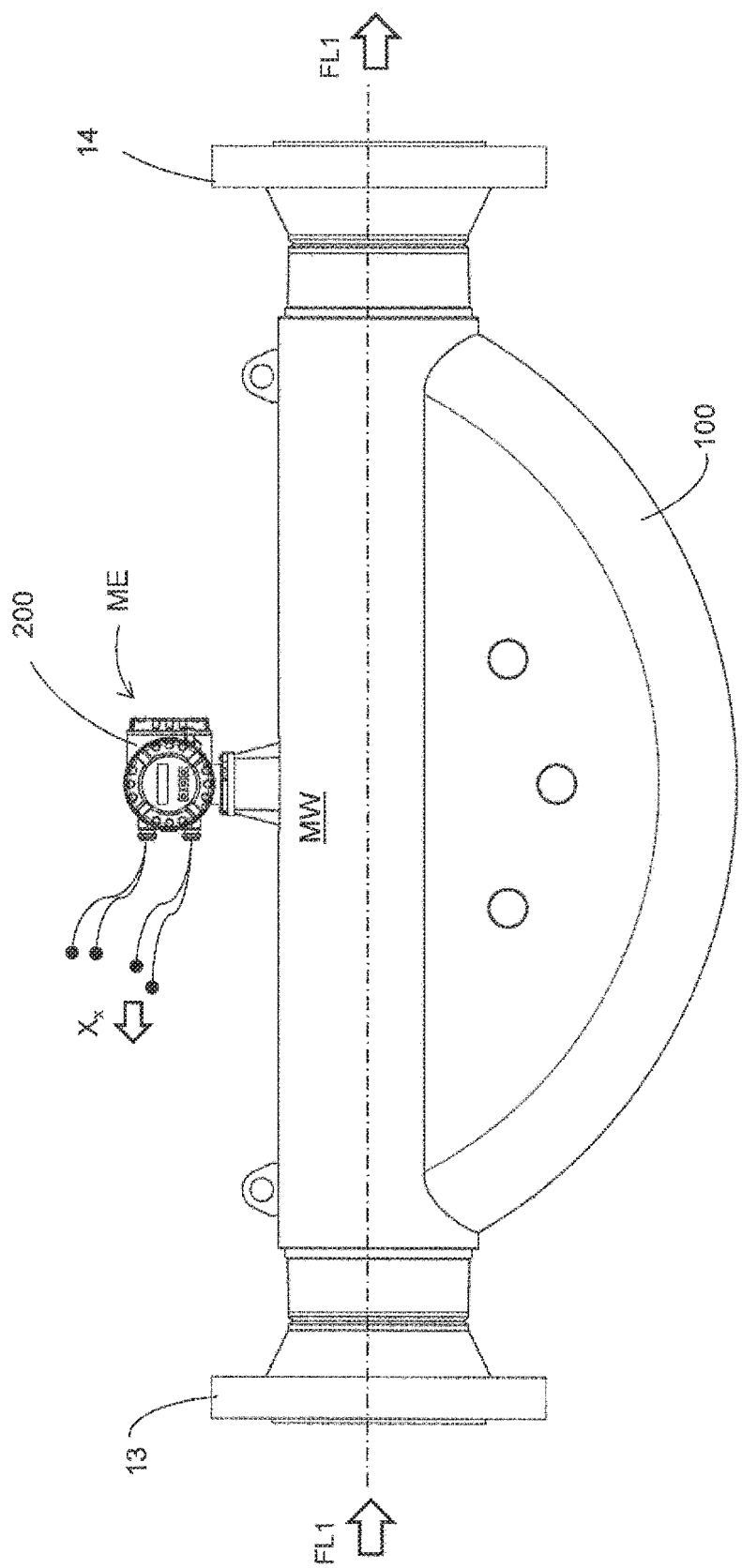

reference mass flow rate, the mass flow measurement values are independent of the temperature difference.

30 Claims, 8 Drawing Sheets

(51) Int. Cl.
G01F 15/02 (2006.01)
G01F 1/84 (2006.01)
G01F 25/00 (2006.01)
G01K 3/04 (2006.01)
G01F 1/86 (2006.01)

(52) U.S. Cl.
CPC .......... G01F 1/8413 (2013.01); G01F 1/8422 (2013.01); G01F 1/8436 (2013.01); G01F 1/8468 (2013.01); G01F 1/8477 (2013.01); G01F 1/8495 (2013.01); G01F 1/86 (2013.01); G01F 15/022 (2013.01); G01F 15/024 (2013.01); G01F 25/0007 (2013.01); G01K 3/04 (2013.01)

(58) Field of Classification Search
CPC ........ G01F 1/8495; G01F 1/74; G01F 1/8422; G01F 1/845; G01F 1/8468; G01F 1/86; G01F 15/022; G01F 15/024; G01F 25/0007; G01K 3/04
See application file for complete search history.

(56) References Cited

U.S. PATENT DOCUMENTS

| | | | | |
|---|---|---|---|---|
| 8,347,735 B2* | 1/2013 | Loving | ............ | G01F 1/8477 73/861.356 |
| 2004/0187599 A1* | 9/2004 | Drahm | ............ | G01F 1/8436 73/861.357 |
| 2006/0016273 A1* | 1/2006 | Bitto | ............ | G01F 1/8413 73/861.355 |
| 2007/0199389 A1* | 8/2007 | Tombs | ............ | G01F 1/8468 73/861.357 |
| 2008/0133152 A1* | 6/2008 | Nitschke | ............ | G01F 1/8436 702/51 |
| 2009/0025473 A1* | 1/2009 | Imai | ............ | G01F 1/7084 73/204.14 |
| 2013/0031973 A1* | 2/2013 | Kirst | ............ | G01N 17/008 73/204.11 |
| 2013/0139613 A1* | 6/2013 | Van Cleve | ............ | G01F 1/8477 73/861.355 |
| 2013/0255399 A1* | 10/2013 | Tombs | ............ | G01F 15/024 73/861.01 |
| 2014/0311255 A1* | 10/2014 | Mouler | ............ | G01F 1/8427 73/861.357 |
| 2017/0074701 A1* | 3/2017 | Rieder | ............ | G01N 9/002 |
| 2019/0323873 A1* | 10/2019 | Bitto | ............ | G01F 1/74 |
| 2019/0376831 A1* | 12/2019 | Rieder | ............ | G01F 1/8436 |
| 2020/0049543 A1* | 2/2020 | Rieder | ............ | G01F 1/845 |

FOREIGN PATENT DOCUMENTS

| | | |
|---|---|---|
| CN | 10 3370605 A | 10/2013 |
| CN | 104105955 A | 10/2014 |
| CN | 10 6030257 A | 10/2016 |
| CN | 10 6104223 A | 11/2016 |
| CN | 106104237 A | 11/2016 |
| DE | 36 32 800 A1 | 4/1988 |
| DE | 42 24 379 C1 | 12/1993 |
| DE | 102 57 322 A1 | 6/2004 |
| DE | 10 2011 080 415 A1 | 2/2013 |
| DE | 10 2014 103 427 A1 | 9/2015 |
| DE | 10 2017 106 211 A1 | 7/2018 |
| EP | 20-19295 A1 | 1/2009 |
| EP | 2629066 A1 | 8/2013 |
| EP | 2 857 805 A1 | 4/2015 |
| JP | 2000 046616 A | 2/2000 |
| JP | 4274385 B1 | 3/2009 |
| WO | 98/52000 | 11/1998 |
| WO | 01/71290 A1 | 9/2001 |

OTHER PUBLICATIONS

International Search Report, EPO, The Netherlands, dated Apr. 4, 2018.
Office Action dated Jun. 30, 2020, issued in corresponding Chinese application No. 2017 80080694.6.

* cited by examiner

VIBRONIC MEASURING SYSTEM FOR MEASURING A MASS FLOW RATE

The invention relates to a vibronic measuring system serving in particular to measure a physical measurement variable of a fluid flowing in a pipeline.

In industrial measurement and automation technology, vibronic measuring systems, namely measuring systems formed by means of a vibronic transducer device, are often used for the highly accurate determination of measurement values for at least one physical measurement variable of a fluid flowing in a pipeline, namely, for example, a material parameter, such as a density, and/or a flow parameter, such as a mass flow rate, of a gas, of a liquid or of a dispersion. In particular, vibronic measuring systems were established in this respect, in which the transducer device comprises at least one tube comprising a lumen surrounded by a wall which is usually metallic, wherein said tube, which extends from an inlet-side first end to an outlet-side second end, is designed to be flowed through at least by a partial volume of the fluid to be measured from the first end toward the outlet-side second end and in the process is caused to vibrate, and in which the transducer device is connected to a measuring and operation electronics unit which is used both for actively exciting and evaluating mechanical vibrations of the tubes and, for example, formed by means of at least one microprocessor.

The respective measuring and operation electronics unit can also be electrically connected via corresponding electrical lines to a superordinate electronic data processing system which is usually arranged spatially remote from the respective measuring system and is usually also spatially distributed and to which the measurement values generated by the respective measuring system are passed on in a timely manner, for example also in real time, by means of at least one measurement value signal suitably carrying these measurement values. Measuring systems of the type in question are also usually connected to each other and/or to corresponding electronic process controllers, such as programmable logic controllers (PLC) installed on site or process host computers installed in a remote control room, by means of a data transmission network provided within the superordinate data processing system, whereto the measurement values generated by means of the respective measuring system and suitably digitized and appropriately encoded are retransmitted. By means of such process host computers, the transmitted measurement values can be further processed and visualized as corresponding measurement results on monitors, for example, and/or converted into control signals for other field devices formed as actuators, such as magnetic valves, electric motors, etc. Since modern measuring arrangements can usually also be monitored directly by such host computers and optionally controlled and/or configured, operating data assigned to the measuring system are likewise sent in a corresponding manner via the aforementioned data transmission networks, which are usually hybrid with regard to the transmission physics and/or transmission logic. The data processing system accordingly usually also serves to condition the measurement value signal supplied by the measuring system according to the requirements of downstream data transmission networks, for example to suitably digitize them and optionally convert them into a corresponding telegram, and/or to evaluate them on site. Evaluation circuits electrically coupled to the respective connecting lines are provided in such data processing systems for this purpose, which circuits process and, if required, suitably convert the measurement values received from the respective measuring system. Field buses, in particular serial field buses, such as FOUNDATION FIELDBUS, RACKBUS-RS 485, PROFIBUS etc., or for example also networks based on the ETHERNET standard as well as the corresponding, usually comprehensively standardized transmission protocols serve to transmit data in such industrial data processing systems at least in sections. Alternatively or additionally, measurement values can also be wirelessly transmitted per radio to the respective data processing system in modern measuring systems of the type in question. In addition to the evaluation circuits required for the processing and conversion of the measurement values supplied by the respectively connected measuring systems, such superordinate data processing systems usually also have electrical supply circuits which serve to supply the connected measuring systems with electrical energy and which provide a corresponding supply voltage, optionally fed directly from the connected field bus, to the respective electronics unit and drive the electrical lines connected thereto and the electrical currents flowing through the respective electronic units. In this case, a supply circuit can, for example, be respectively assigned precisely to one measuring system or to one corresponding electronics unit and, together with the evaluation circuit assigned to the respective measuring system, for example combined to form a corresponding field bus adapter, be accommodated in a common electronics housing designed, for example, as a top-hat rail module. However, it is also quite common to respectively accommodate supply circuits and evaluation circuits in separate, optionally spatially separated electronics housings and to connect them to each other accordingly via external lines.

The design and mode of operation of vibronic transducer devices of the type in question or of vibronic measuring systems formed therewith, for example also as Coriolis mass flow measuring devices and/or also as density and/or viscosity measuring devices, are known per se to the person skilled in the art and, for example, also shown in US-A 2001/0037690, US-A 2004/0031328, US-A 2004/0187599, US-A 2005/0125167, US-A 2006/0161359, US-A 2007/0119264, US-A 2010/0242623, US-A 2011/0113896, US-A 2011/0146416, US-A 2011/0265580, US-A 2012/0073384, US-A 2014/0060154, US-A 47 68 384, US-A 48 01 897, US-A 50 24 104, US-A 56 02 345, US-A 57 96 012, US-A 63 11 136, US-B 75 49 319, WO-A 01/29519, WO-A 01/71290, WO-A 02/097379, WO-A 2005/031285, WO-A 2009/134268, WO-A 2012/018323, WO-A 2012/033504, WO-A 2013/092104 WO-A 2014/151829, WO-A 2015/135738, WO-A 2015/135739, WO-A 2015/165468, WO-A 2016/058745, WO-A 2016/059132, WO-A 2015/156767, WO-A 88/02853, WO-A 94/21999, WO-A 96/07081, WO-A 98/52000, WO-A 98/02725 or WO-A 99/39164. Accordingly, such a transducer device respectively has an electromechanical exciter arrangement which is formed by means of at least one, for example electrodynamic, vibration exciter and which is designed to excite or maintain useful vibrations of the at least one tube, namely mechanical vibrations with at least one predeterminable vibration frequency of the tube about an associated static rest position, for example mechanical vibrations of the tube about an imaginary axis of vibration imaginarily connecting its first end to its second end. Electrodynamic vibration exciters, namely vibration exciters formed by means of a permanent magnet fixed to the tube and by means of an excitation coil fixed to another tube, for example a tube that is also flowed through, and interacting with the permanent magnet, are typically used. Serving as useful vibrations of the tube are vibrations that are suitable to induce, in the flowing fluid, Coriolis forces dependent on a mass flow rate (m), optionally also vibrations that are suitable to induce, in the flowing fluid, frictional or damping forces dependent on a viscosity (η) and/or are suitable to induce, in the flowing fluid, inertial forces dependent on a density (ρ). In the vibronic measuring systems of the type in question is usually selected as useful frequency, namely as vibration frequency of the useful vibrations, a resonant frequency inherent in the at least one fluid-carrying tube, namely typically a resonant frequency of a fundamental bending vibration mode of the at least one tube.

In order to sense mechanical vibrations of the at least one tube, not least also the useful vibrations and/or Coriolis vibrations induced by the aforementioned Coriolis forces, the transducer devices used in vibronic measuring systems of the type in question also respectively have a vibration sensor arrangement which is formed by means of at least two, for example electrodynamic or optical, vibration sensors and which is designed to generate at least two vibration signals, namely an electrical measurement signal representing vibration movements of the at least one tube, for example, by means of an electrical alternating (signal) voltage dependent on a velocity of the vibration movements of the tubes or a corresponding vibration frequency; this in particular such that a phase difference dependent on the mass flow rate exists between the at least two vibration signals or such that each of the at least two vibration signals has a signal frequency corresponding to a vibration frequency of the at least one tube. The vibration sensors, which serve to sense vibrations, of such transducer devices are arranged in the flow direction at a distance from each other on the at least one tube such that one of the vibration sensors, forming an inlet-side first vibration measuring point, is positioned less far from the first end of the tube than from the second end and the other of the vibration sensors, forming an outlet-side second vibration measuring point, is positioned less far from the second end of the tube than from the first end.

Transducer devices of the type in question also typically respectively comprise a transducer housing which has a cavity surrounded by a, for example metallic, wall and within which the at least on tube, including the components mounted thereon of the at least [one] vibration exciter and the at least one vibration sensor, is arranged in a manner allowing the aforementioned vibrations of the tube, namely such that an intermediate space, which is usually filled with air or an inert gas, is formed between an inner surface, facing the cavity, of the wall of the transducer housing and a lateral surface of the wall of the tube, namely an outer surface, facing the cavity, of the wall of the tube. In addition, the respective measuring and operation electronics unit is also typically accommodated within at least one comparatively robust, in particular impact-resistant, pressure-resistant and/or weather-proof, electronics housing. The electronics housing, which is, for example, made of stainless steel or aluminum, can be arranged remote from the transducer device and connected thereto via a flexible cable; however, it can, for example, also be arranged on or fixed directly to the transducer device, namely, for example, to the aforementioned transducer housing.

The measuring and operation electronics unit of such vibronic measuring systems is further designed to receive and process, namely, for example, to digitize and evaluate, each of the at least two vibration signals. The measuring and operation electronics unit in particular recurrently generates, using the at least two vibration signals, a mass flow measurement value, namely a measurement value representing the mass flow rate, or the measuring and operation electronics unit generates, using the at least two vibration signals, a mass flow sequence, namely a series of temporally successive mass flow measurement values respectively instantaneously representing the mass flow rate of the fluid. However, in addition to evaluating the at least two vibration signals, the measuring and operation electronics unit of vibronic measuring systems of the aforementioned type typically also serves to generate at least one drive signal, for example a harmonic and/or clocked drive signal, for the at least one electromechanical vibration exciter. Said drive signal can, for example, be regulated with regard to a current intensity and/or a voltage level and/or a signal frequency.

In the case of vibronic measuring systems used in industrial measurement and automation technology, the measuring and operation electronics unit is usually realized by means of one or more microprocessors, optionally also formed as digital signal processors (DSP), such that the measuring and operation electronics unit determines the respective measurement values for the at least one material or flow parameter by numerical calculation of digital sampling values obtained from measurement signals of the respective transducer device, namely, for example, based on the at least two vibration signals, and provides them in the form of corresponding digital values, in particular also in real time.

In transducer devices of the type in question or in vibronic measuring systems formed therewith, another (auxiliary) measurement variable which is important for the operation, not least also for the precise determination of the measurement values for the at least one material or flow parameter, is inter alia also a transducer device temperature (target temperature) which is suitable to characterize a thermodynamic state of the transducer device or its influence on the relevant vibration properties of the transducer device for the measurement of the at least one material or flow parameter. In particular, the transducer device temperature should be suitable for metrologically compensating a dependence of the vibration properties of the at least one tube or of the vibration measurement signals on a spatial temperature distribution within the transducer device to a degree sufficient for the desired high measurement accuracy with which the measurement values for the at least one measurement variable, not least also the measurement values for the mass flow rate or the density and/or viscosity determined by computer-based real-time calculation, are to be determined. In the case of measuring systems of the type in question, said transducer device temperature is routinely determined based on a tube temperature sensed on the wall of the at least one tube. In order to sense the tube temperature, such transducer devices, such as inter alia also shown in the aforementioned US-A 57 96 012, US-A 2004/0187599, US-A 2005/0125167, WO-A 2009/134268, WO-A 01/71290, WO-A 98/52000 or WO-A 98/02725, can therefore further comprise one or more temperature sensors respectively formed by means of a temperature probe, for example a platinum measuring resistor, a thermistor or a thermocouple, which is arranged within the intermediate space and thus not contacted by the lumen of the at least one tube during operation, wherein the respective temperature sensor is respectively thermally conductively coupled to the wall of the at least one tube and electrically coupled to the measuring and operation electronics unit. The temperature sensor can be formed by means of a single temperature probe or by means of electrical circuits formed by a plurality of such temperature-sensitive electrical or electronic components, for example in the form of a Wheatstone measuring bridge. The at least one temperature sensor is designed to convert a measuring point temperature corresponding to a temperature at a temperature measuring point formed by means of the respective temperature probe into a corresponding temperature measurement signal, namely an electrical measurement signal representing the respective measuring point temperature, for example with an electrical signal voltage dependent on said measuring point temperature and/or an electrical signal current dependent on said measuring point temperature. The measuring and operation electronics unit may furthermore also be designed to generate measurement values for the at least one measurement variable using the at least one temperature measurement signal generated by means of the transducer device.

Experimental studies on conventional transducer devices of the type in question have shown that surprisingly high measurement errors, for example also of more than 0.05% or more than 1 kg/h, can occasionally be observed not only, as inter alia also discussed in the aforementioned WO-A 2009/134268, in the case of an inside, facing the lumen, of a wall with an undesired deposition, but also in the case of its use for measuring the mass flow rate of fluids with a comparatively low specific heat capacity, namely, for example, a specific heat capacity in a range between $1 \text{ kJ} \cdot \text{kg}^{-1} \cdot \text{K}^{-1}$ and $4.2 \text{ kJ} \cdot \text{kg}^{-1} \cdot \text{K}^{-1}$, and/or in the case of use in applications with a rapidly changing measuring point temperature, for example as a result of a fluid temperature changing rapidly over time or as a result of abrupt measurement material changes, despite inclusion of the aforementioned temperature measurement signal in the calculation of the mass flow measurement values. Although the aforementioned temperature difference $\Delta\vartheta$ for the cases discussed in WO-A 2009/134268 is routinely larger than in the case of an intact transducer device or in the case of an intact tube, in particular with walls without deposition and otherwise the same boundary conditions, it can nonetheless assume a level that is no longer negligible for the actually desired high measurement accuracy. Such increased measurement errors could in particular be found in applications with very hot (>50 K) or very cold (−50 K) gases compared to a temperature of an atmosphere surrounding the transducer device (ambient temperature), in applications with comparatively rapidly flowing high-viscosity oils, e.g. in the filling of storage tanks or fuel tanks on ships (bunkering), in intermittently operated measuring points, such as in bottling plants, or even in connection with the measurement of the mass flow rate in process plants to be recurrently cleaned (CIP—cleaning in place) or sterilized (SIP—sterilization in place) in place using hot cleaning fluids. In a vibronic measuring system shown in the aforementioned WO-A 2016/058745, the associated transducer device is temperature controlled before the actual measurement in order to reduce such measurement errors, namely brought to a steady operating temperature which corresponds to a measurement material temperature to be expected during the actual measurement or to a corresponding thermal equilibrium state, or a liquid to be measured is appropriately conditioned, namely for example vented, in advance. In this case, this is carried out by a corresponding recirculation of the fluid to be measured in each case. For this purpose, the measuring system has an additional although expensive valve control and additional supply and return fluid lines. Further investigations of conventional transducer devices used in this way or exposed to corresponding measuring conditions in the laboratory have however furthermore shown that the aforementioned phase difference between the at least two vibration signals can spread to a significant degree, namely to a degree significantly impairing the measurement accuracy, despite constant mass flow rate and constant measuring point temperature, therefore even in the case of a transducer device in the thermal equilibrium state or in the case of actually steady measuring conditions; this in particular also in the case of fluid flows having low Reynolds numbers (Re) of less than 1000, namely in particular laminar fluid flows or fluid flows constantly maintained at a mass flow rate of less than 1 kg/h, for example also zero.

Taking this into account, it is an object of the invention to improve a measurement accuracy of measuring systems of the aforementioned type in such a way that the mass flow measurement values determined therewith for flowing fluids with a low specific heat capacity and/or with a fluid temperature that significantly deviates from an ambient temperature and/or for fluid flows with a low Reynolds number (<1000) or a mass flow rate of less than 1 kg/h reproducibly have a small measurement error, in particular of less than 0.05% and/or less than 1 kg/h.

In order to achieve this object, the invention consists in a vibronic measuring system for measuring a mass flow rate of a fluid, in particular a fluid flowing in a pipeline, in particular a gas, a liquid or a dispersion. For this purpose, the measuring system has a measuring and operation electronics unit formed in particular by means of a microprocessor and/or a digital signal processor, as well as a transducer device which is electrically coupled, in particular also mechanically connected, to said measuring and operation electronics unit. The transducer device comprises:

a first tube which comprises a lumen surrounded by a, for example metallic, wall and which extends from an inlet-side first end to an outlet-side second end and which is provided or designed to be flowed through by at least a partial volume of the fluid from the inlet-side first end toward the outlet-side second end and in the process is caused to vibrate;

a first temperature sensor which is thermally conductively coupled to the wall of the first tube and which is positioned less far from the first end of the first tube than from the second end of said first tube and which is provided or designed to sense a first measuring point temperature, namely a temperature of the wall of the first tube at an inlet-side first temperature measuring point formed by means of said temperature sensor and to convert it into a first temperature measurement signal, namely a first electrical measurement signal representing the first measuring point temperature, for example with an electrical signal voltage dependent on said first measuring point temperature and/or with an electrical signal current dependent on said first measuring point temperature;

a second temperature sensor which is, for example, thermally conductively coupled to the wall of the first tube like the first temperature sensor and which is, for example, identical in design to the first temperature sensor and which is positioned less far from the second end of the first tube than from the first end of said first tube and which is provided or designed to sense a second measuring point temperature, namely a temperature of the wall of the first tube at a second temperature measuring point that is formed by means of said temperature sensor and that is remote from the first temperature measuring point and/or on the outlet side, and to convert it into a second temperature measurement signal, namely a second electrical measurement signal representing the second measuring point temperature, for example with an electrical signal volt-age dependent on said second measuring point temperature and/or with an electrical signal current dependent on said second measuring point temperature;

at least one, for example electrodynamic, vibration exciter for exciting and maintaining mechanical vibrations of the first tube about an associated static rest position, namely in particular bending vibrations of the first tube about an imaginary axis of vibration imaginarily connecting its first end to its second end;

a, for example electrodynamic, first vibration sensor for sensing mechanical vibrations of the first tube, which sensor is positioned less far from the first end of the first tube than from the second end of said first tube and which sensor is provided or designed to sense vibration movements of the first tube at an inlet-side first vibration measuring point formed by means of said vibration sensor and to generate a first vibration signal representing said vibration movements;

and at least one second vibration sensor, which is, for example, electrodynamic and/or identical in design to the first vibration sensor, for sensing mechanical vibrations of the first tube, which sensor is positioned less far from the second end of the first tube than from the first end of said first tube and which sensor is provided or designed to sense vibration movements of the first tube at an outlet-side second vibration measuring point formed by means of said vibration sensor and to generate a second vibration signal representing said vibration movements such that between the first vibration signal and said second vibration signal there exists a phase difference which depends on both the mass flow rate and a temperature difference which is established between a temperature of the first vibration sensor and a temperature of said second vibration sensor and which changes over time, for example at least temporarily, with a rate of change of more than 0.05 K/s.

The measuring and operation electronics unit of the measuring system according to the invention is electrically connected both to each of the first and second vibration sensors and to each of the first and second temperature sensors and also to the at least one vibration exciter. The measuring and operation electronics unit is firstly designed to feed electrical power into the at least one vibration exciter in order to effect mechanical vibrations of the first tube by means of an electrical exciter signal. Secondly, the measuring and operation electronics unit is designed to generate, using each of the first and second vibration signals as well as each of the first and second temperature measurement signals, a mass flow sequence, namely a series of temporally successive mass flow measurement values respectively instantaneously representing the mass flow rate of the fluid such that the mass flow measurement values at least for a reference mass flow rate of a reference fluid, which flows through the transducer device, flows through the first tube, for example also laminarly and/or with a Reynolds number of less than 1000, and/or has a specific heat capacity of more than 1 kJ·kg$^{-1}$·K$^{-1}$ and/or less than 4.2 kJ·kg$^{-1}$·K$^{-1}$, are independent of the temperature difference.

In addition, the invention also consists in using the measuring system according to the invention to measure at least one physical measurement variable, in particular a density and/or a viscosity and/or a mass flow rate and/or a volumetric flow rate, of a flowing fluid, in particular a fluid flowing in a pipeline, in particular a gas, a liquid or a flowable dispersion.

According to a first embodiment of the invention, the mass flow measurement values determined for the reference mass flow rate are independent of the temperature difference in that mass flow measurement values determined temporally successively for at least one reference mass flow rate, which is not equal to zero although constant, deviate from each other by no more than 0.01% of said reference mass flow rate even in the case of various temperature differences, namely differences of more than 1 K and/or less than 10 K and/or differences spreading over time with a range of more than 1 K and/or differences changing over time with a rate of change of more than 0.05 K/s.

According to a second embodiment of the invention, the mass flow measurement values determined for the reference mass flow rate are independent of the temperature difference in that mass flow measurement values respectively representing a zero scale mark of the measuring and operation electronics unit, namely mass flow measurement values temporally successively respectively determined in the case of a transducer device through which no fluid flows or for a reference mass flow rate of zero, are less than 0.01 kg/h or deviate from each other by less than 0.01 kg/h, even in the case of various temperature differences, albeit temperature differences of more than 1 K and/or less than 10 K and/or temperature differences spreading over time with a range of more than 1 K and/or less than 10 K and/or temperature differences changing over time with a rate of change of more than 0.05 K/s.

According to a third embodiment of the invention, the reference fluid, which is, for example, liquid or gaseous, has a specific heat capacity of more than 1 kJ·kg$^{-1}$·K$^{-1}$ and/or less than 4.2 kJ·kg$^{-1}$·K$^{-1}$.

According to a fourth embodiment of the invention, the reference fluid is a liquid, for example an oil or water.

According to a fifth embodiment of the invention, the reference fluid is a gas, for example air.

According to a sixth embodiment of the invention, the reference fluid is water, in particular with a fluid temperature of not less than 20° C.

According to a seventh embodiment of the invention, the reference fluid is an oil, in particular with a fluid temperature of not less than 20° C. and/or with a viscosity of more than $10^{-2}$ Pa·s (pascal seconds).

According to an eighth embodiment of the invention, the reference fluid is an oil, for example with a fluid temperature of not less than 20° C. and/or with a viscosity of more than $10^{-2}$ Pa·s (pascal seconds), and it is furthermore provided that the reference mass flow rate is, depending on a magnitude |D| of a nominal width of the transducer device given in the SI base unit for length (m=meters), less than |D|·10000 kg/h.

A ninth embodiment of the invention provides that the reference fluid is a gas, in particular with a fluid temperature of not less than 20° C., and/or air.

A tenth embodiment of the invention provides that the reference fluid is a gas, for example with a fluid temperature of not less than 20° C., and/or air, and that the reference mass flow rate is, depending on a magnitude |D| of a nominal width of the transducer device given in the SI base unit for length (m=meters), less than |D|·1000 kg/h.

According to an eleventh embodiment of the invention, the temperature difference is also established in the case of an intact transducer device or intact first tube.

According to a twelfth embodiment of the invention, the temperature difference is greater in the case of an inside, facing the lumen, of a wall with an undesired deposition than in the case of an intact first tube, namely, for example, with walls without deposition.

According to a thirteenth embodiment of the invention, the measuring and operation electronics unit is designed to generate, using both the first vibration signal and the second vibration signal, a phase difference sequence, namely a series of temporally successive phase difference measurement values respectively representing the phase difference.

According to a fourteenth embodiment of the invention, the measuring and operation electronics unit is designed to generate, using both the first temperature measurement signal and the second temperature measurement signal, a temperature difference sequence, namely a series of temporally successive temperature difference measurement values respectively representing the temperature difference.

According to a fifteenth embodiment of the invention, the measuring and operation electronics unit is designed to generate, using both the first temperature measurement signal and the second temperature measurement signal, a temperature difference sequence, namely a series of temporally successive temperature difference measurement values respectively representing the temperature difference, and to monitor, using the temperature difference sequence, a functionality of the transducer device, namely in particular a functionality of the first tube.

According to a sixteenth embodiment of the invention, the measuring and operation electronics unit is designed to generate, using both the first temperature measurement signal and the second temperature measurement signal, a temperature difference sequence, namely a series of temporally successive temperature difference measurement values respectively representing the temperature difference, and to diagnose, using the temperature difference sequence, that the transducer device has a flow resistance which is changed in comparison to an original flow resistance, namely in particular that the first tube has a flow resistance which is changed in comparison to an original flow resistance.

According to a seventeenth embodiment of the invention, the measuring and operation electronics unit is designed to generate, using both the first temperature measurement signal and the second temperature measurement signal, a temperature difference sequence, namely a series of temporally successive temperature difference measurement values respectively representing the temperature difference, and to generate, using the temperature difference sequence, an alarm which signals an only limited functionality of the transducer device, in particular as a result of a flow resistance of the first tube which is changed in comparison to an original flow resistance.

According to an eighteenth embodiment of the invention, the measuring and operation electronics unit is designed to generate, using both the first temperature measurement signal and the second temperature measurement signal, a measurement fluid temperature measurement value, namely a measurement value representing a temperature of a fluid flowing through the first tube.

According to a nineteenth embodiment of the invention, the measuring and operation electronics unit is designed to generate, using at least one of the vibration signals and at least one of the temperature measurement signals, a density measurement value which represents a density of the fluid.

According to a twentieth embodiment of the invention, the measuring and operation electronics unit is designed to generate, using at least one of the vibration signals and at least one of the temperature measurement signals, a viscosity measurement value which represents a viscosity of the fluid.

According to a twenty-first embodiment of the invention, the measuring and operation electronics unit is designed to generate, using both the first temperature measurement signal and the second temperature measurement signal, a transducer temperature measurement value which represents a transducer device temperature, which deviates from both the first measuring point temperature and the second measuring point temperature, such that a magnitude of said transducer temperature measurement value corresponds to an arithmetic mean of the first and second measuring point temperatures and/or a weighted average of the first and second measuring point temperatures and/or represents an average tube wall temperature of the first tube. This embodiment of the invention further provides in a further development that the measuring and operation electronics unit is designed to generate, using the first temperature measurement signal although not the second temperature measurement signal, and/or using the second temperature measurement signal although not the first temperature measurement signal, an auxiliary temperature measurement value, which at least approximately represents the transducer device temperature.

A twenty-second embodiment of the invention provides that the measuring and operation electronics unit comprises a multiplexer which has at least two signal inputs and at least one signal output and which is designed to optionally, for example cyclically, switch one of its signal inputs through to the signal output such that a signal applied to the respectively switched-through signal input is passed to the signal output; and that the measuring and operation electronics unit comprises an analog-to-digital converter, for example with a nominal resolution of more than 16 bits and/or clocked with a sampling rate of more than 1000 s⁻, with at least one signal input and at least one signal output, which analog-to-digital converter is designed to convert an analog input signal applied to said signal input with a sampling rate of, for example, more than $1000\,s^{-1}$ and with a digital resolution of, for example, more than 16 bits into a digital output signal representing said input signal and to provide it at the signal output. This embodiment of the invention further provides in a further development that the at least one signal output of the multiplexer and the at least one signal input of the analog-to-digital converter are electrically coupled to one another; and that the first temperature sensor and the second temperature sensor are respectively electrically connected to the multiplexer such that the first temperature measurement signal is applied to a first signal input of the multiplexer and the second temperature measurement signal is applied to a second signal input of the multiplexer. The output signal of the analog-to-digital converter can thus at least temporarily represent precisely one of the two temperature measurement signals or the measuring and operation electronics unit can generate the mass flow measurement value using the output signal, representing one of the two temperature measurement signals, of the analog-to-digital converter.

A twenty-third embodiment of the invention provides that the first temperature sensor is positioned less far from the first end of the first tube than the second temperature sensor from the first end of the first tube.

A twenty-fourth embodiment of the invention provides that the second temperature sensor is positioned less far from the second end of the second tube than the first temperature sensor from the second end of the first tube.

A twenty-fifth embodiment of the invention provides that the first temperature sensor is positioned at the same distance from the first end of the first tube as the second temperature sensor from the second end of the first tube.

A twenty-sixth embodiment of the invention provides that the first temperature sensor is positioned at the same distance from the second end of the first tube as the second temperature sensor from the first end of the first tube.

A twenty-seventh embodiment of the invention provides that the first temperature sensor is positioned at the same distance from a center of the first tube as the second temperature sensor.

A twenty-eighth embodiment of the invention provides that the first temperature sensor and the second temperature sensor are identical in design.

A twenty-ninth embodiment of the invention provides that the first temperature sensor is mechanically coupled to the wall of the first tube in the same way as the second temperature sensor.

A thirtieth embodiment of the invention provides that the transducer device has no other temperature sensor contacting the wall of the first tube than the first temperature sensor and the second temperature sensor.

A thirty-first embodiment of the invention provides that the first temperature sensor is thermally conductively coupled to the wall of the first tube in the same way as the second temperature sensor, in particular such that a heat resistor counteracting a heat flow flowing from the wall of the first tube to the first temperature sensor and further to an atmosphere surrounding the first temperature sensor is equal to a heat resistor counteracting a heat flow flowing from the wall of the first tube to the second temperature sensor and further to an atmosphere surrounding the second temperature sensor.

A thirty-second embodiment of the invention provides that the first vibration sensor is thermally conductively coupled to the wall of the first tube in the same way as the second vibration sensor, for example such that a heat resistor counteracting a heat flow flowing from the wall of the first tube to the first vibration sensor and further to an atmosphere surrounding the first vibration sensor is equal to a heat resistor counteracting a heat flow flowing from the wall of the first tube to the second vibration sensor and further to an atmosphere surrounding the second vibration sensor.

A thirty-third embodiment of the invention provides that a temperature sensor arrangement, formed by means of the first temperature sensor and by means of the second temperature sensor, of the transducer device is axially symmetric with respect to at least one imaginary symmetry axis, which imaginarily intersects the transducer device, namely for example with respect to a main axis of inertia of the first tube.

A thirty-fourth embodiment of the invention provides that a vibration sensor arrangement formed by means of the first vibration sensor and by means of the second vibration sensor is mirror-symmetric with respect to at least one imaginary symmetry axis, which imaginarily intersects the transducer device, namely is in particular parallel to a main axis of inertia of the first tube.

A thirty-fifth embodiment of the invention provides that the first temperature sensor is positioned at the same distance from the first vibration sensor as the second temperature sensor from the second vibration sensor.

A thirty-sixth embodiment of the invention provides that the first tube is mirror-symmetric with respect to at least one imaginary symmetry axis, which imaginarily intersects the tube, namely in particular coincides with a main axis of inertia of said tube.

A thirty-seventh embodiment of the invention provides that the first tube is curved, for example V-shaped or U-shaped.

A thirty-eighth embodiment of the invention, provides that the first tube is straight, namely, for example, circular cylindrical, at least in sections, for example predominantly or even entirely.

A thirty-ninth embodiment of the invention provides that the first tube is curved, for example in a circular arc, at least in sections.

A fortieth embodiment of the invention provides that the wall of the first tube consists at least partially, for example also predominantly or entirely, of a material, such as a metal or an alloy, a specific thermal conductivity of which is greater than 10 W/(m·K) and a specific heat capacity of which is less than 1000 J/(kg·K).

A forty-first embodiment of the invention provides that the wall of the first tube consists of metal, for example iron and/or aluminum and/or chromium and/or titanium and/or zirconium and/or tantalum and/or nickel-containing alloy.

A forty-second embodiment of the invention provides that the wall of the first tube consists of stainless steel.

A forty-third embodiment of the invention provides that the first tube has a caliber which is more than 0.1 mm (millimeters).

A forty-fourth embodiment of the invention provides that the first tube has a caliber which is more than 1 mm (millimeter).

A forty-fifth embodiment of the invention provides that an unwound tube length of the first tube is more than 300 mm.

According to a forty-sixth embodiment of the invention, the vibration exciter is designed to excite or maintain mechanical vibrations of the first tube when driven by the exciter signal.

A forty-seventh embodiment of the invention provides that the first temperature sensor is formed by means of a first temperature probe which, for example, comprises a platinum measuring resistor, a thermistor or a thermocouple and by means of a first coupling body coupling said first temperature probe thermally conductively to the wall of the first tube and that the second temperature sensor is formed by means of a second temperature probe which comprises, for example, a platinum measuring resistor, a thermistor or a thermocouple and/or is identical in design to the first temperature probe and by means of a second coupling body which couples said second temperature probe thermally conductively to the wall of the second tube and is, for example identical in design to the first coupling body. This embodiment of the invention further provides in a further development that the first coupling body is formed, for example entirely, by means of a plastic, namely, for example, an epoxy resin or a silicone, which is placed between the wall of the first tube and the first temperature probe, in particular contacts both the lateral surface of the wall and the first temperature probe and/or is mixed with metal oxide particles, and that the second coupling body is formed, for example entirely, by means of a plastic, for example an epoxy resin or a silicone, which is placed between the wall of the second tube and the second temperature probe, in particular contacts both the lateral surface of the wall and the second temperature probe and/or is mixed with metal oxide particles.

A forty-eighth embodiment of the invention provides that the first temperature sensor is integrally, for example adhesively, connected to the lateral surface of the wall of the first tube, for example by means of a thermal adhesive, forming the first coupling body and that the second temperature sensor is integrally, for example adhesively, connected to the lateral surface of the wall of the first tube, for example by means of a thermal adhesive, forming the second coupling body.

According to a first further development of the measuring system of the invention, the measuring system furthermore comprises: a second tube which comprises a lumen surrounded by a wall, in particular a metallic wall, and which extends from an inlet-side first end to an outlet-side second end and which is in particular at least in sections curved and/or at least in sections straight and/or identical in design to the first tube and/or which is arranged parallelly to the first tube and which is designed to be flowed through by a fluid, in particular simultaneously with the first tube, from the inlet-side first end toward the outlet-side second end and in the process is caused to vibrate, in particular simultaneously with or mirror-invertedly to the first tube. The measuring system may furthermore comprise an inlet-side first flow divider and an outlet-side second flow divider, wherein the first and the second tube, forming flow paths which are fluidically connected in parallel and to which can be connected the flow dividers, which are in particular identical in design, such that the first tube with its first end opens into a first flow opening of the first flow divider and with its second end opens into a first flow opening of the second flow divider, and that the second tube with its first end opens into a second flow opening of the first flow divider and with its second end opens into a second flow opening of the second flow divider. The flow dividers can also respectively be an integral part of a transducer housing of the transducer device.

According to a second further development of the measuring system of the invention, the measuring system furthermore comprises: a transducer housing which has a cavity surrounded by a wall, in particular a metallic wall, wherein at least the first tube is arranged within the cavity of the transducer housing such that an intermediate space is formed between an inner surface, facing the cavity, of the wall of the transducer housing, a lateral surface, facing the cavity, of the wall of the first tube, and wherein the transducer housing and the first tube are designed to hold in the intermediate space a fluid, for example a fluid with a specific thermal conductivity of less than 1 W/(m (K), for example air or an inert gas, forming a fluid volume surrounding the first tube such that the lateral surface, facing the intermediate space, of the wall of the first tube, forming a first interface of the first type, namely an interface between a fluid and a solid phase, is contacted by fluid held in the intermediate space.

According to a third further development of the measuring system of the invention, the measuring system further comprises: an inlet-side first connecting flange serving, for example, to connect the transducer device to a line segment of a process line supplying the fluid, and an outlet-side second connecting flange serving, for example, to connect the transducer device to a line segment of a process line discharging the fluid again. Each of the connecting flanges can, for example, also respectively comprise a sealing surface for the fluid-tight or leak-free connection of the transducer device to a respective corresponding line segment of a process line, and a shortest distance between said sealing surfaces can define an installation length of the transducer device of, for example, more than 250 mm an/or less than 3000 mm, for example in such a way that a ratio of tube length to installation length of the transducer device defined by a ratio of an unwound tube length of the first tube to said installation length of the transducer device is more than 1.2, in particular more than 1.4.

A basic idea of the invention consists in taking into account or compensating in the calculation of the measurement values for the mass flow rate a dependence of the phase difference between the at least two vibration measurement signals on a temperature gradient occasionally established along the at least one tube; this in particular such that the low measurement errors desired for the vibronic measuring systems of the type in question of less than 0.05% (of the actual measurement value) are also achieved for such difficult or previously not mastered measuring conditions, in which a temperature difference of more than 1 K occurs between the respectively two vibration measuring points or in which said temperature difference changes over time with a rate of change of more than 0.05 K/s.

The invention is based inter alia on the surprising finding that the aforementioned temperature gradients can on the one hand influence the vibration properties, not least the natural vibration modes, of the tube, and that on the other hand, the aforementioned temperature differences can lead to deviations between the nominally identical but naturally temperature-dependent transmission functions of each vibration sensor (temperature response) along with a corresponding asymmetry between the vibration signals. Such temperature gradients established along the at least one tube or temperature differences established between the two vibration sensors, which (co-)influence the phase difference between the vibration measurement signals, can occur not only in the case of an inside, facing the lumen, of a wall with an undesired deposition, but are surprisingly also observed on intact transducer devices for such measuring conditions, in which an enthalpy of the fluid to be measured deviates significantly from an enthalpy of the fully intact wall of the tube and in which the kinetic energy of the fluid flow is comparatively low, namely, for example, for such measuring conditions, in which an Eckert number (Ec) of comparatively low magnitude accordingly results for the fluid flow.

Figure 2:
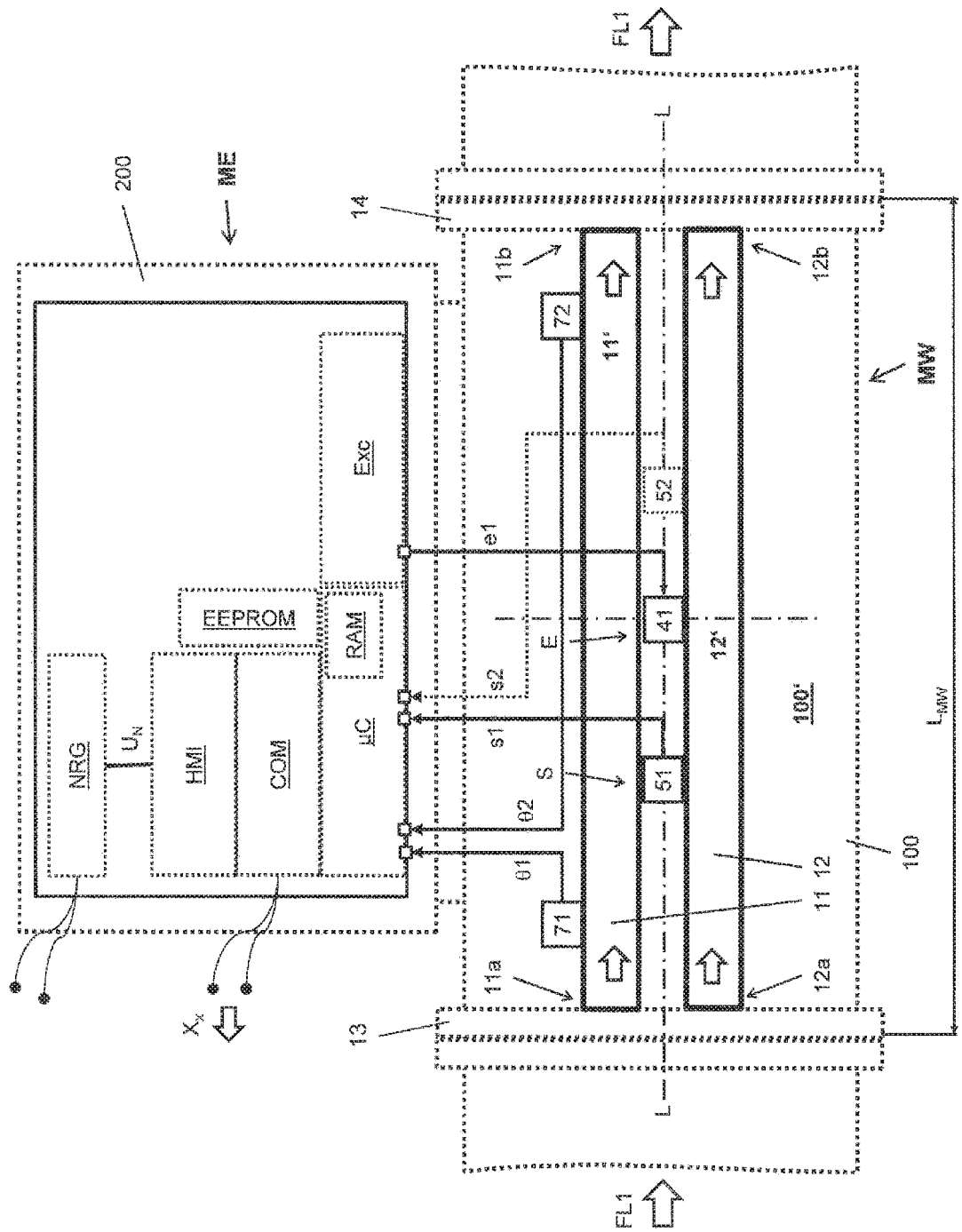
Figure 3B:
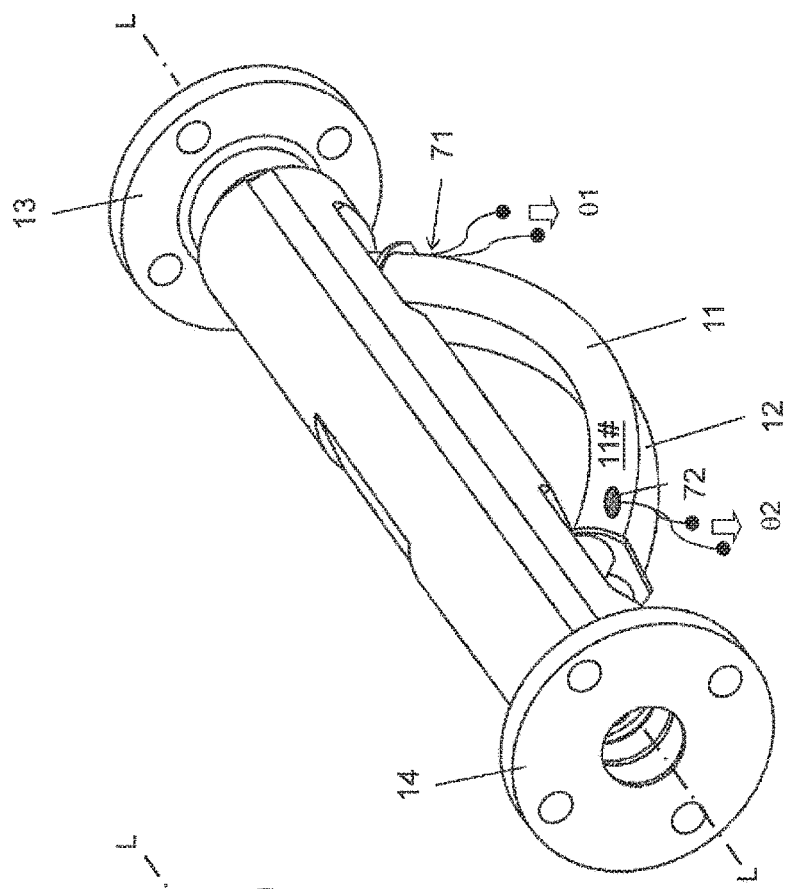
Figure 3A:
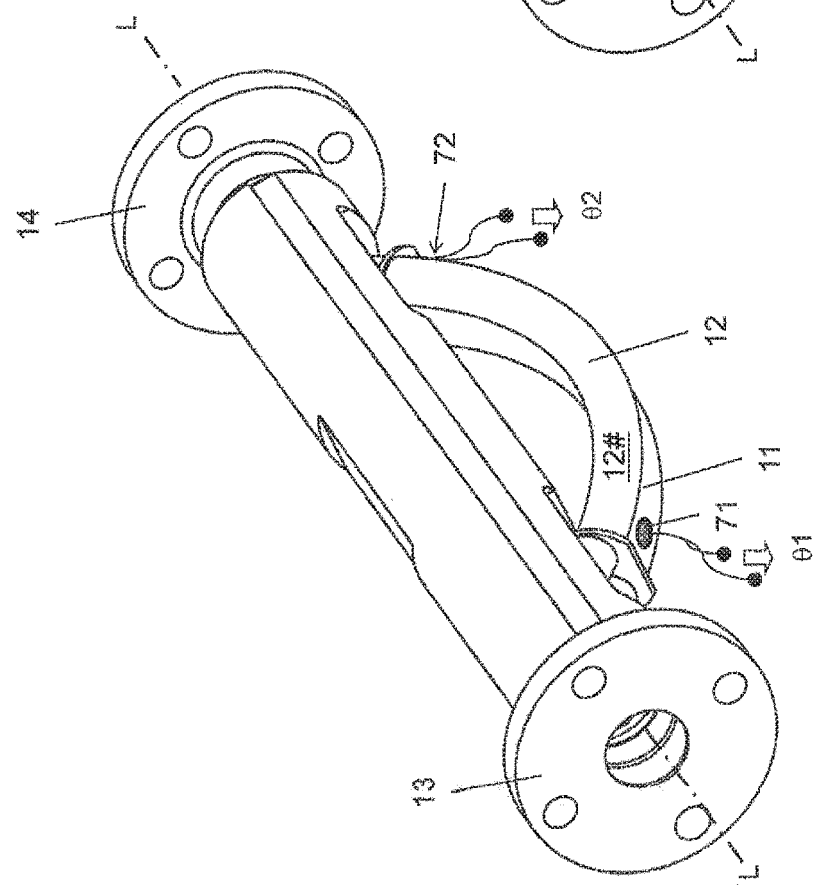
Figure 4:
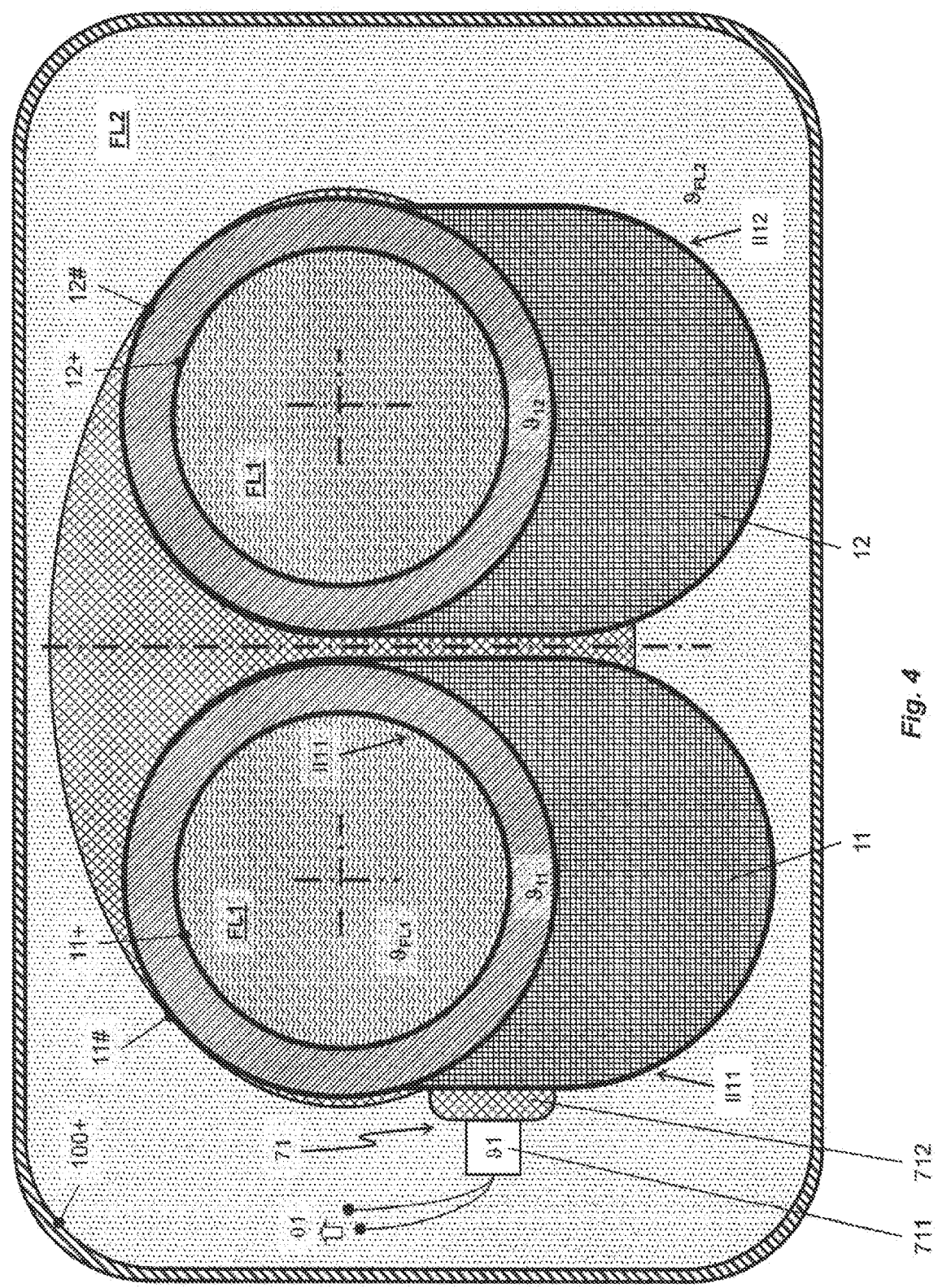
Figure 5:
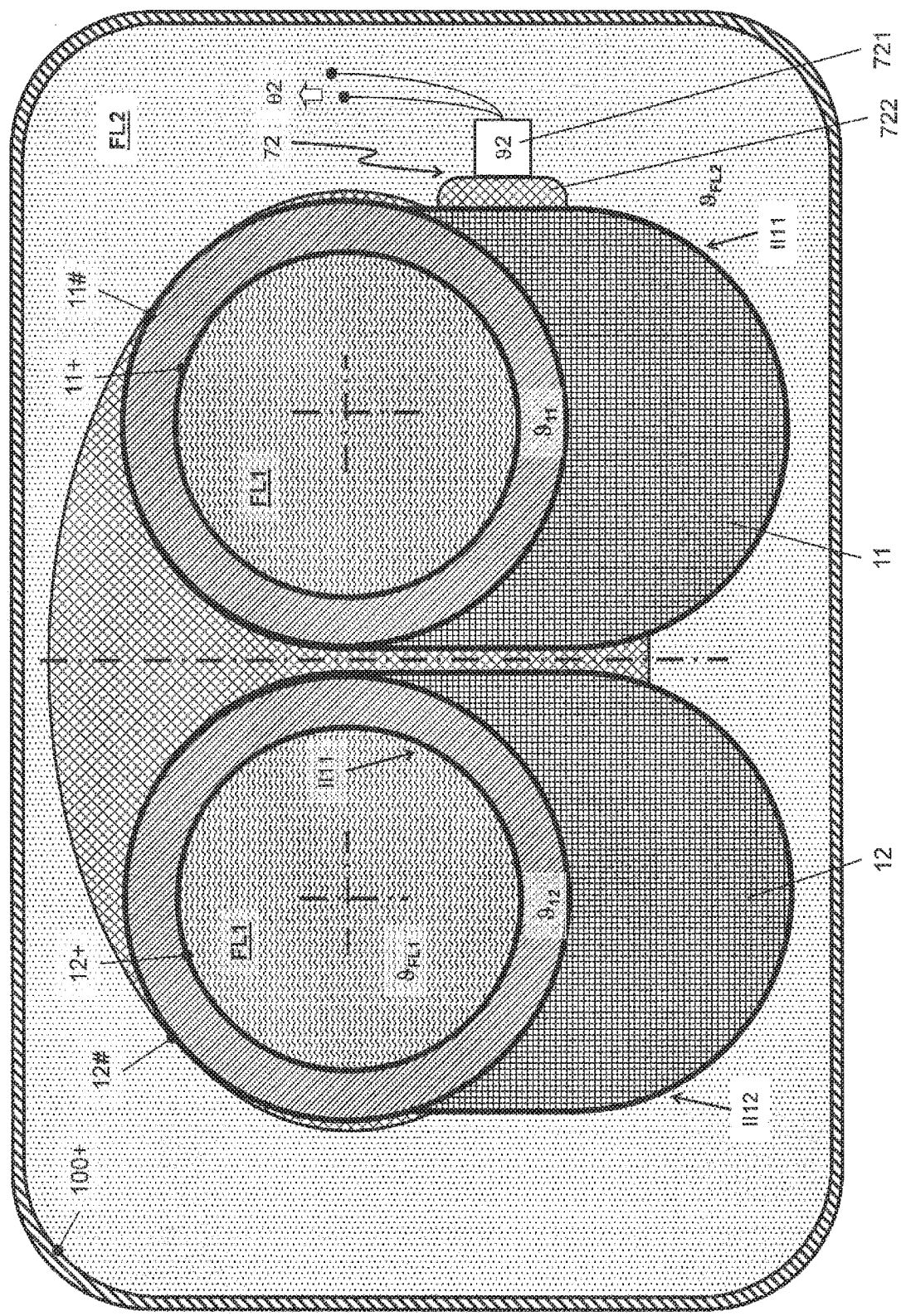

The invention as well as other advantageous embodiments of it are in the following explained using some design examples shown in the figures of the drawing. The same parts are labeled with the same reference sign in all figures; for reasons of clarity or if it appears sensible for other reasons, reference signs used before are not repeated in the following illustrations. Further advantageous embodiments or further developments, esp. combinations of partial aspects of the invention that were originally explained separately may be derived from the illustrations in the drawing and from the sub-claims themselves. The figures show in detail:

FIG. 1 a measuring system, in particular a measuring system suitable for use in industrial measurement and automation technology, with a transducer device having a transducer housing and with a measuring and operation electronics unit accommodated in an electronics housing, in this case fastened directly to the transducer housing;

FIG. 2 a schematic illustration of an exemplary embodiment of a measuring system according to FIG. 1;

FIG. 3a, 3b perspective side views of a transducer device suitable for a measuring system according to FIG. 1 or 2;

FIG. 4 a sectional side view of a transducer device suitable for a measuring system according to FIG. 1 or 2;

FIG. 5 another sectional side view of the transducer device according to FIG. 4.

Figure 6B:
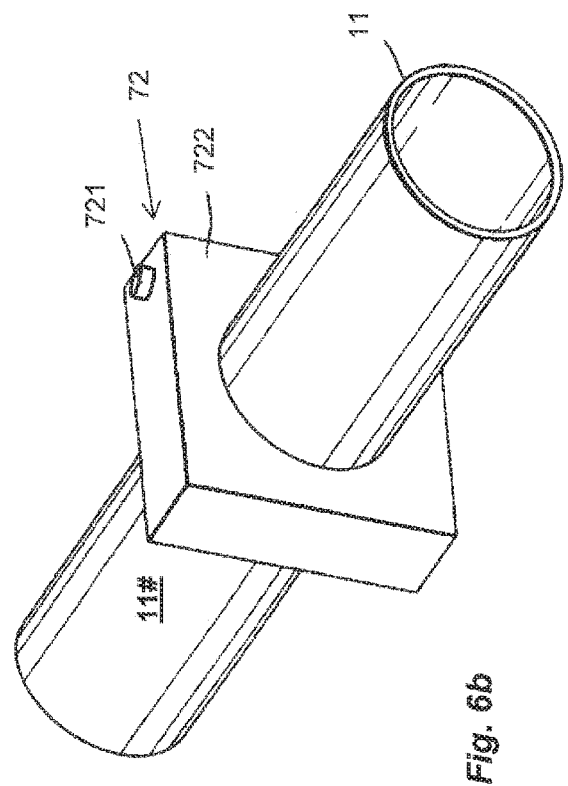
Figure 6A:
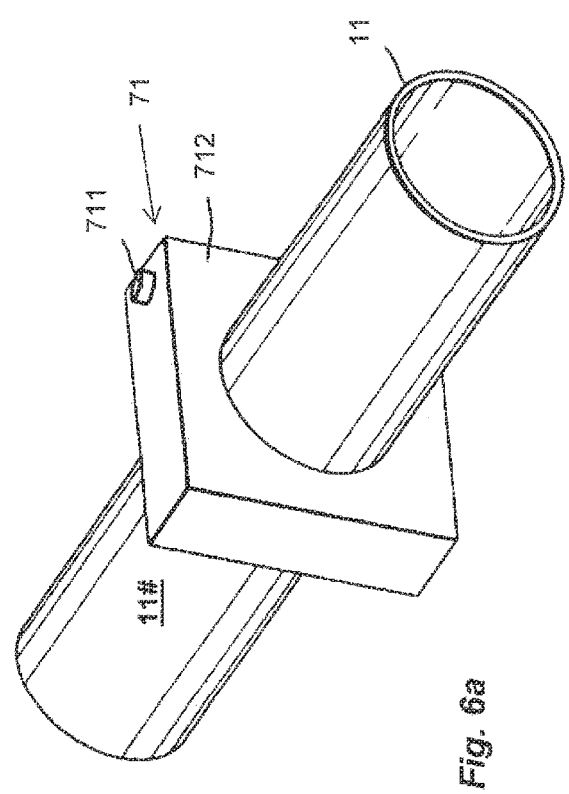
Figure 7:
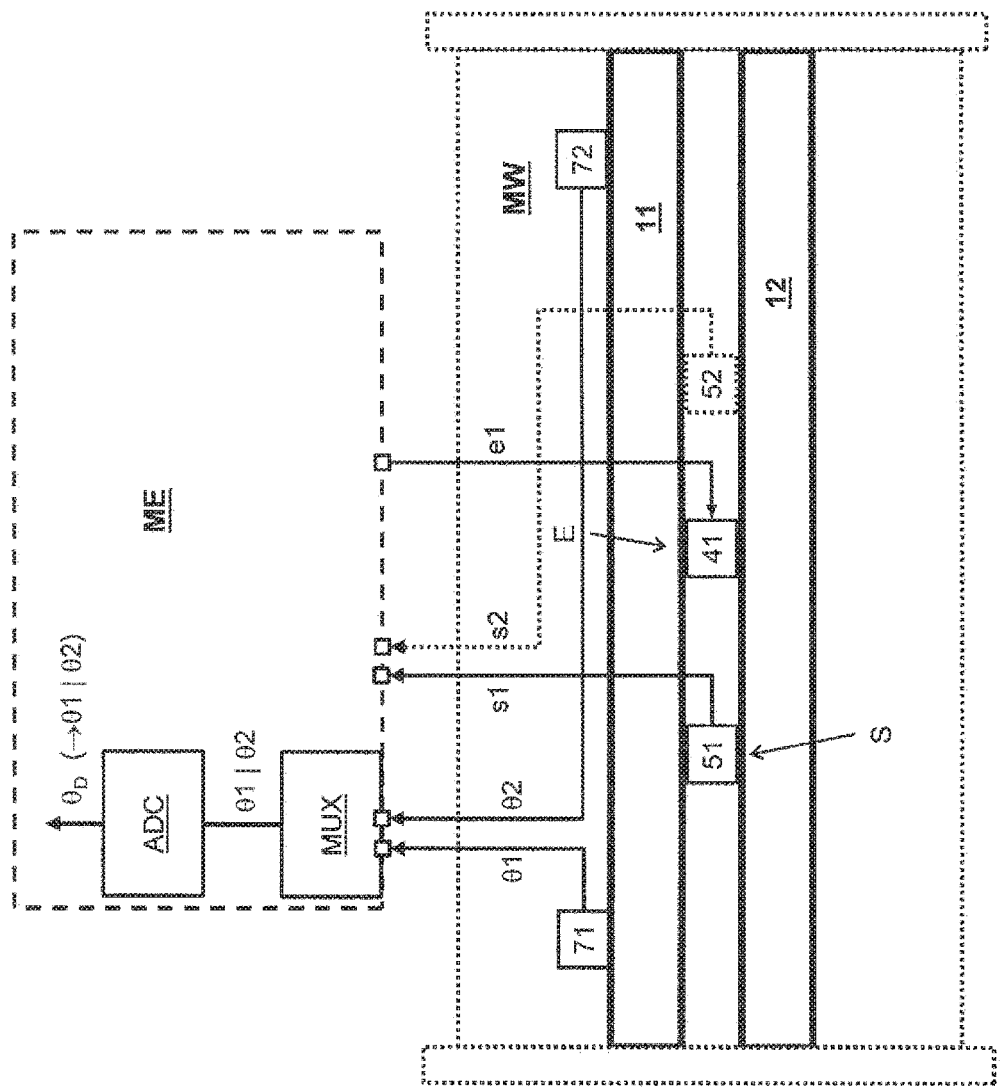
Figure 8:
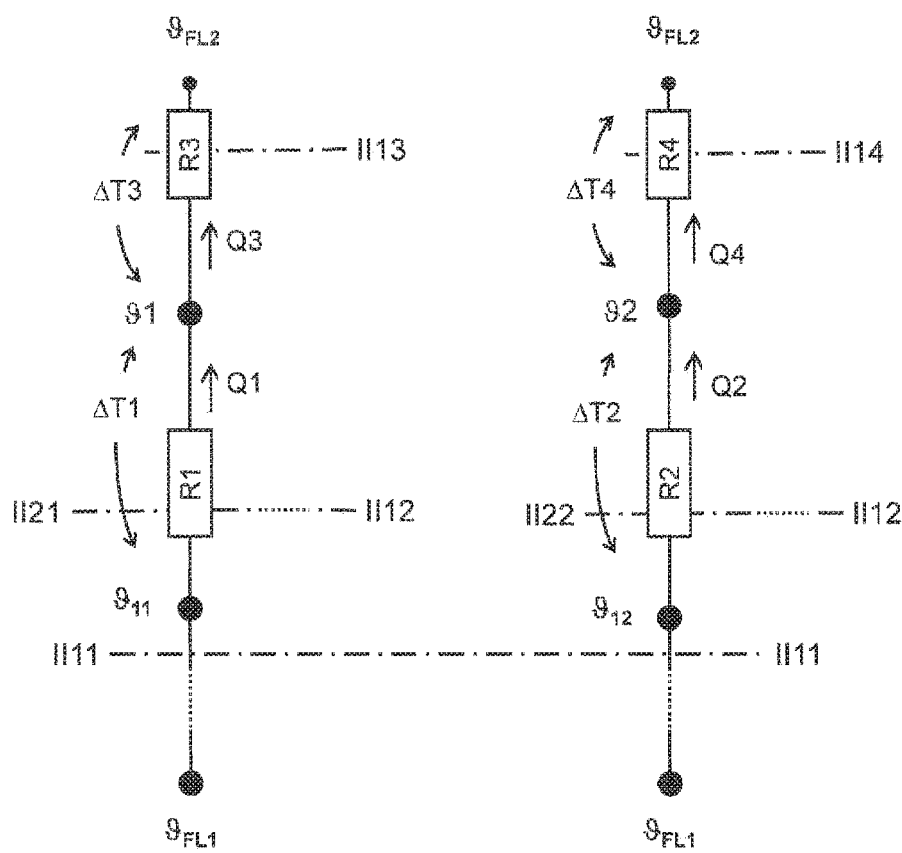

FIG. 6a, 6b different sectional side views of further exemplary embodiments for temperature sensors, in particular temperature sensors suitable for a transducer device according to FIGS. 3a, 3b or a measuring system according to FIG. 1;

FIG. 7 a schematic illustration of another exemplary embodiment of a measuring system according to FIG. 1; and FIG. 8 a resistor network formed by means of a plurality of discrete heat resistors in the manner of an equivalent circuit and serving to explain heat flows flowing in a transducer device according to FIG. 2, or 3a, 3b or 4, 5 or corresponding temperature drops within said transducer device.

FIG. 1 shows a schematic illustration of a vibronic measuring system for measuring a mass flow rate m of the flowing fluid FL1 (measurement fluid), optionally having a temporally and/or spatially changing measurement fluid temperature $\vartheta_{FL1}$, such as a gas, a liquid or a flowable dispersion, or for recurrently determining of mass flow measurement values $x_m$ instantaneously representing said mass flow rate m. The measuring system may also be designed to determine at least one further measurement variable, namely, for example, a material parameter, of the fluid FL. Said further measurement variable may, for example, be a density ρ, a viscosity η or else a measurement fluid temperature $\vartheta_{FL1}$ of the fluid flowing, for example, through a pipeline.

For this purpose, the measuring system comprises a transducer device MW for generating measurement signals serving at least to measure the mass flow rate and a measuring and operation electronics unit ME, which is electrically connected to said transducer device MW, is in particular supplied with electrical energy during operation by an external energy storage device via a connecting cable and/or by means of an internal energy storage device, for generating the measurement values representing the measurement variable(s) sensed by the transducer device or for sequentially outputting such measurement values $x_m$ as a respectively currently valid measurement value $x_x$ ($x_m \rightarrow x_x$) of the measuring system to a corresponding measurement output, for example also in the form of digital measurement values and/or in real time.

As shown schematically in FIG. 2 or as can be seen from a combination of FIGS. 1 and 2, the transducer device of the measuring system serves in particular to guide or to be flowed through by a partial volume of the fluid FL1 to be respectively measured during operation and to provide various measurement signals for physical measurement variables to be respectively sensed by means of the transducer device and for measuring point temperatures prevailing at various measuring points within the transducer device. For this purpose, the transducer device is equipped with at least a first tube 11, which comprises a lumen 11' surrounded by a wall and which is, for example, at least in sections curved and/or at least in sections straight. The wall of the tube 11 can, as is common in transducer devices of the type in question, be metallic, namely, for example, at least partially consist of titanium, zirconium or tantalum or, for example, also of stainless steel. The tube 11 extends, as inter alia indicated in FIG. 2, from an inlet-side first end 11a to an outlet-side second end 11b and is designed to be flowed through by a fluid from the inlet-side first end 11a toward the outlet-side second end 11b and in the process is caused to vibrate. Furthermore, the tube 11 of the transducer device according to the invention can be at least in sections straight, consequently in sections (hollow) cylindrical, namely, for example, circular cylindrical, and/or at least in sections curved, namely, for example, in a circular arc. The tube 11 can furthermore be designed to be mirror-symmetric with respect to at least one imaginary symmetry axis which imaginarily intersects the tube, namely, for example, coincides with a main axis of inertia of the tube, namely, for example, to be V-shaped or U-shaped. A further embodiment of the invention furthermore provides for the wall of the tube 11 to consist at least partially, for example also predominantly or entirely, of a material, a specific thermal conductivity λ10 of which is more than 10 W/(m·K) and a specific heat capacity cp10 of which is less than 1000 J/(kg·K).

In the transducer device according to the invention or the measuring system formed therewith, the tube 11 is provided or designed to be flowed through by at least a partial volume of the fluid FL1 in a flow direction, namely starting from the end 11a toward the end 11b, and in the process is caused to vibrate; this in particular such that the tube 11 is allowed to carry out useful vibrations, namely mechanical vibrations about an associated static rest position, which are suitable for inducing in the fluid flowing through, Coriolis forces dependent at least on the mass flow rate m of the fluid. In addition, the useful vibrations carried out by the tube 11 can also be suitable for effecting, in the fluid, frictional forces dependent on the viscosity η of the fluid and/or inertial forces dependent on the density ρ of the fluid. The transducer device may accordingly, for example, also be designed as a transducer of the vibration type serving as a component of a vibronic measuring system, for example of a Coriolis mass flow measuring device, of a density measuring device and/or of a viscosity measuring device.

As already indicated, the wall of the tube 11 may, for example, consist of a metal or a metal alloy, namely, for example, titanium, zirconium or tantalum or a corresponding alloy thereof, a steel or a nickel-based alloy. Another embodiment of the invention furthermore provides that the wall of the tube 11 has a wall thickness s which is more than 0.5 mm and/or a caliber D11 (inner diameter) which is more than 0.5 mm. Alternatively or additionally, the tube 11 may furthermore be dimensioned such that it has an inner diameter to wall thickness ratio D/s, defined as a ratio of the inner diameter D of the tube to a wall thickness s of the wall of the tube, which is less than 25:1. A further embodiment of the invention furthermore provides for the wall thickness of the tube 11 to be less than 10 mm and/or for the inner diameter D to be less than 200 mm or for the tube 11 to be dimensioned in such a way that the inner diameter to wall thickness ratio D/s is more than 5:1. As is quite common in the transducer devices of the type in question, the tube 11 may moreover be accommodated in a transducer housing 100 of the transducer device such that, as also respectively shown in FIGS. 4 and 5 or readily apparent from a combination of FIGS. 1, 2, 4 and 5, the tube 11 is respectively arranged within one and the same cavity of the transducer housing, which cavity is surrounded by a wall of the transducer housing, for example a metallic wall and/or a wall serving as outer protective cover, and that between an inner surface 100+, facing said cavity, of the wall of the transducer housing 100, a lateral surface 11 #of the wall of the tube 11, namely an outer surface, facing the cavity, of the wall of the tube 11, an intermediate space 100' is formed. The tube 11 and said transducer housing are in this case also designed to hold in the intermediate space 100' a fluid FL2, for example a fluid with a specific thermal conductivity of less than 1 W/(m (K), namely, for example, air or an inert gas, forming a fluid volume surrounding the tube 11, such that the lateral surface 11 #, facing the intermediate space, of the wall of the tube 11, forming a first interface II11 of the first type, namely an interface between a fluid and a solid phase, is contacted.

As indicated in FIG. 2, the transducer device MW may furthermore be designed to be inserted, namely, for example, detachably mounted with the process line, in the course of a process line which conducts the fluid and which is, for example, designed as a rigid pipeline. For this purpose, a first connecting flange 13 serving to connect the transducer device to a line segment of the process line conducting the fluid FL1 can be provided on the inlet side of the transducer device and a second connecting flange 14 serving to connect to a line segment of the process line discharging the fluid again can be provided on the outlet side of the transducer device. As is quite common in a transducer device of the type in question, or as indicated in FIG. 2, the connecting flanges 13, 14 can optionally also be integrated at the end into the aforementioned transducer housing 100, namely as an integral component of the transducer housing. A further embodiment of the invention furthermore provides that each of the connecting flanges 13, 14 respectively has a sealing surface for the fluid-tight or leak-free connection of the transducer device to a respectively corresponding line segment of a process line and that a shortest distance between said sealing surfaces moreover defines an installation length $L_{MW}$ of the transducer device; this in particular such that said installation length $L_{MW}$ is more than 250 mm and/or less than 3000 mm and/or such that a tube length to installation length ratio $L_{11}/L_{MW}$ of the transducer device, defined by a ratio of an unwound tube length $L_{11}$ of the tube 11 to the aforementioned installation length $L_{MW}$, is more than 1.2, for example also more than 1.4. The aforementioned unwound tube length $L_{11}$ of the tube 11 (elongated length) can also be more than 300 mm, for example.

The measuring and operation electronics unit ME formed, for example, by means of at least one microprocessor and/or by means of a digital signal processor (DSP) can in turn, as indicated in FIG. 2, be accommodated, for example, in a single, optionally also compartmentalized, electronics housing 200 of the measuring system. Said electronics housing 200 may, depending on the requirement for the measuring system, also be designed to be impact-resistant and/or explosion-proof and/or hermetically sealed, for example. The measuring device electronics unit ME can, as also shown schematically in FIG. 2 in the manner of a block diagram, have a measuring and evaluation circuit μC, which processes measurement signals of the transducer device MW and which is, for example, formed by means of a microprocessor and which during operation generates corresponding measurement values for the measurement variable to be sensed by means of the measuring system. The measuring and evaluation circuit μC of the measuring and operation electronics unit ME may, for example, be realized by means of a microcomputer comprising at least one microprocessor and/or one digital signal processor (DSP). The program codes to be executed by this microcomputer as well as operating parameters serving to control the respective measuring system, such as setpoint values for controllers or controller algorithms implemented by means of the measuring and operation electronics unit, can, as also schematically illustrated in FIG. 2, be stored persistently, for example in a non-volatile data memory EEPROM of the measuring and operation electronics unit ME, and loaded into a volatile data memory RAM, which is, for example, integrated into the microcomputer, when the measuring and operation electronics unit ME starts. Incidentally, the measuring and operation electronics unit ME can also be designed such that it substantially corresponds in terms of the circuitry design to one of the measuring and operation electronics units known from the aforementioned prior art, such as US-B 63 11 136, or, for example, to a measuring transducer of a Coriolis mass flow/density measuring device offered by the applicant under the name "PROMASS 83 F," for example.

The measurement values $x_x$ ($x_m$, $x_\rho$, $x_\eta$, $x_\theta$...) generated by means of the measuring and operation electronics unit ME can in the case of the measuring system shown here be displayed on site, namely directly at the measuring point formed by means of the measuring system. In order to on site visualize measurement values generated by means of the measuring system and/or system status messages internally generated by the measuring device where appropriate, such as an error message signaling increased measurement inaccuracy or measurement unreliability or an alarm signaling a fault in the measuring system itself or at the measuring point formed by means of the measuring system, the measuring system can, as also indicated in FIG. 2, for example, have a display and operating element HMI, which communicates with the measuring and operation electronics unit and is optionally also portable, such as an LCD, OLED, or TFT display placed in the electronics housing 200 behind a window provided therein accordingly, and an appropriate input keyboard and/or a touch screen. In a favorable way, the measuring and operation electronics unit ME, which can, for example, also be (re)programmed or remotely parameterized, can also be designed such that it can exchange measurement and/or other operating data, such as current measurement values, system diagnosis values, system status messages, or setting values serving to control the measuring system, during operation of the measuring system with an electronic data processing system, which is superordinate to the measuring system, for example a programmable logic controller (PLC), a personal computer (PC) and/or a workstation via a data transmission system, for example a field bus system, such as FOUNDATION FIELDBUT, PROFIBUS, and/or wirelessly via radio. Furthermore, the measuring and operation electronics unit ME can be designed such that it can be supplied by an external power supply, for example via the aforementioned field bus system. For this purpose, the measuring and operation electronics unit ME can have, for example, an internal power supply circuit NRG for providing internal supply voltages UN, which internal power supply circuit is supplied during operation via the aforementioned field bus system by an external power supply provided in the aforementioned data processing system. In this case, the measuring system can, for example, be designed as a so-called four-wire device, in which the internal power supply circuit of the measuring device electronics unit ME can be connected by means of a first pair of lines to an external power supply and the internal communication circuit of the measuring and operation electronics unit ME can be connected by means of a second pair of lines to an external data processing circuit or an external data transmission system. However, the measuring and operation electronics unit may also be designed such that, as inter alia also shown in the aforementioned US-A 2006/0161359, it can be electrically connected by means of a two-wire connection, which is, for example, configured by means of a 4-20 mA current loop, to the external electronic data processing system and is supplied with electrical power via this connection and can transmit measurement values to the data processing system, optionally also using HART Multidrop. For the typical case, in which the measuring system is provided for coupling to a field bus or another electronic communication system, the measuring and operation electronics unit ME, which can, for example, also be (re) programmed on site and/or via the communication system, can moreover have a corresponding communication interface COM, for example a communication interface compliant with the relevant industry standards, such as IEC 61158/ IEC 61784, for a data communication, for example for sending measurement and/or operating data, thus the measurement values representing the respective measurement variable, to the aforementioned programmable logic controller (PLC) or a superordinate process control system and/or for receiving setting data for the measuring system. The electrical connection of the transducer device to the measuring and operation electronics unit can take place by means of corresponding connecting lines which are guided out of the electronics housing 200, for example via cable feedthrough, into the transducer housing 100 and are also laid within the transducer housing 100 at least in sections. In this case, the connecting lines can be formed at least partially as conductor wires enveloped at least in sections by an electrical insulation, for example in the form of "twisted pair" lines, ribbon cables and/or coaxial cables. Alternatively or additionally, the connecting lines can also be formed at least in sections by means of conductor tracks of a printed circuit board, which is optionally also coated, for example a flexible or partially rigid and partly flexible printed circuit board, cf. also the aforementioned US-A 2001/0037690 or WO-A 96/07081.

In order to excite and maintain mechanical vibrations of the tube 11 about an associated static rest position, namely in particular mechanical vibrations of the tube 11 about an imaginary axis of vibration imaginarily connecting the respective first end to the respective second end, or the aforementioned useful vibrations, the transducer device furthermore comprises an electromechanical exciter arrangement E formed by means of at least one vibration exciter 41, which is, for example, electrodynamic and in particular formed by means of a plunger coil or realized as a voice coil.

In order to sense mechanical vibrations of the tube 11, the transducer device furthermore comprises a sensor arrangement S formed by means of at least one first vibration sensor 51, which is, for example, electrodynamic and/or of the same type as the vibration exciter, and by means of a second vibration sensor 52, which is, for example, electrodynamic and/or identical in design to the vibration sensor 51. The vibration sensor 51 is designed to sense vibration movements of the tube 11 at an inlet-side first vibration measuring point formed by means of said vibration sensor 51 and to generate a first vibration signal s1 representing said vibration movements, while the vibration sensor 52 is provided or designed to sense vibration movements of the tube 11 at an outlet-side second vibration measuring point formed by means of said vibration sensor 52 and to generate a second vibration signal s2 representing said vibration movements; this in particular such that a phase difference (co-)dependent inter alia also on a mass flow rate of the fluid flowing through the tube 11 exists between the vibration signal s1 and the vibration signal s2. For this purpose, as also indicated in FIG. 2, the vibration sensor 51 is positioned less far from the end 11a of the tube 11 than from the end 11b, and the vibration sensor 52 is positioned less far from the end 11b of the tube 11 than from the end 11a, in particular such that the vibration sensor 51 is positioned at the same distance from the end 11a as the vibration sensor 52 from the end 11b. The vibration sensor arrangement thus formed by means of the two vibration sensors 51, 52 can, as is quite common in a transducer device of the type in question, also, for example, be mirror-symmetric with respect to at least one imaginary symmetry axis imaginarily intersecting the transducer device, namely, for example, with respect to a symmetry axis parallel both to a main axis of inertia of the tube 11 and to a main axis of inertia of the tube 12. According to another embodiment of the invention, the vibration sensor 51 is thermally conductively coupled to the wall of the at least one tube 11 in the same way as the vibration sensor 12, in particular such that a heat resistor counteracting a heat flow flowing from the wall of the tube 11 to the vibration sensor 51 and further to an atmosphere surrounding the vibration sensor 51 is equal to a heat resistor counteracting a heat flow flowing from the wall of the tube 11 to the vibration sensor 52 and further to an atmosphere surrounding the vibration sensor 52.

In order to sense measuring point temperatures prevailing within the transducer device and to convert them into a respective temperature measurement signal, not least to compensate a dependence of the aforementioned phase difference on a temperature gradient established in the flow direction within the wall of the tube 11 or on a temperature difference $\Delta\vartheta$ which is established between a temperature of the vibration sensor 51 and a temperature of the vibration sensor 52 and which changes over time, for example at least temporarily, with a rate of change of more than 0.05 K/s, the transducer device according to the invention furthermore comprises, as shown in FIG. 2, 3a, 3b and also in FIG. 4 or 5, a first temperature sensor 71 coupled mechanically although thermally conductively to the wall of the tube 11 and a second temperature sensor 72 also coupled mechanically although thermally conductively to the wall of the tube 11. Said temperature difference $\Delta\vartheta$ can occur in the case of an intact transducer device or intact tube 11 or, as also discussed in the aforementioned WO-A 2009/134268, particularly also in the case of an inside, facing the lumen, of a wall with an undesired deposition. In the latter case, the temperature difference $\Delta\vartheta$ is routinely greater in the case of an intact tube 11, in particular with a wall without deposition, and otherwise the same boundary conditions.

The temperature sensors 71, 72 are also electrically connected to the measuring and operation electronics unit ME, for example by respectively two of the aforementioned electrical connecting lines. As also respectively shown in FIG. 2 or 3a, the temperature sensor 71 is positioned less far from the first end 11a of the tube 11 than from the second end 11b of said tube 11, while the temperature sensor 72, as also illustrated in FIG. 2 or FIG. 3b is positioned less far from the second end 11b of the tube 11 than from the first end 11a of said tube 11; this in particular such that the temperature sensor 71 is positioned at the same distance from the end 11a of the tube 11 as the temperature sensor 72 from the end 11b or that the temperature sensor 71 is positioned at the same distance from the end 11b of the tube 11 as the temperature sensor 72 from the end 11a. Alternatively or additionally, the temperature sensor 71 may, for example, also be positioned at the same distance from a center of the tube 11 as the temperature sensor 72. Moreover, the two temperature sensors 71, 72 can furthermore also be positioned such that the temperature sensor 71 and the temperature sensor 72, as also indicated in FIG. 2 or readily apparent in a combination of FIGS. 2, 4 and 5, are azimuthally, namely, for example, in a projection onto an imaginary cross-sectional surface comprising an imaginary longitudinal axis L of the transducer device as surface normal, diametrically opposed to each other with respect to said longitudinal axis L, which longitudinal axis corresponds, for example, to a main flow direction of the transducer device. The two temperature sensors 71, 72 can also, in particular, furthermore be positioned or arranged such that a temperature sensor arrangement of the transducer device formed by means of said temperature sensors 71, 72 is axially symmetric with respect to at least one imaginary symmetry axis imaginarily intersecting the transducer device, namely, for example, an imaginary symmetry axis parallel to a main axis of inertia of the tube 11. In addition, the temperature sensor 71, as also indicated in FIG. 2, can, for example, also be positioned at the same distance from the vibration sensor 51 as the second temperature sensor 72 from the vibration sensor 52.

The temperature sensor 71 is in particular provided or designed to sense a first measuring point temperature $\vartheta 1$, namely a temperature at a first temperature measuring point formed by means of said temperature sensor 71, and to convert it into a first temperature measurement signal θ1, namely a first electrical measurement signal representing the first measuring point temperature ϑ1. In addition, the temperature sensor 72 is provided or designed to sense a second measuring point temperature ϑ2, namely a temperature at a second temperature measuring point formed by means of said temperature sensor 72 and to convert it into a second temperature measurement signal θ2, namely a second electrical measurement signal representing the second measuring point temperature ϑ2. Each of the temperature measurement signals θ1, θ2 may, for example, be designed such that it has an electrical signal voltage dependent on the respective measuring point temperature ϑ1 or ϑ2 and/or an electrical signal current dependent on said measuring point temperature. According to a further embodiment of the invention, the temperature sensor 71 is coupled thermally conductively to the wall of the tube 11 in the same way as the temperature sensor 72; this, for example, also such that a heat resistor counteracting a heat flow flowing from the wall of the tube 11 to the temperature sensor 71 and further to an atmosphere surrounding said temperature sensor 71 is equal to a heat resistor counteracting a heat flow flowing from the wall of the tube 11 to the temperature sensor 72 and further to an atmosphere surrounding the temperature sensor 72. It is furthermore provided that the temperature sensor 71 is mechanically coupled to the wall of the tube 11 in the same way as the temperature sensor 72. According to a further embodiment of the invention, as is also schematically illustrated in FIG. 4, the temperature sensor 71 is formed by means of a first temperature probe 711 arranged within the intermediate space 100' and by means of a first coupling body 712 which couples said temperature probe 711 thermally conductively to the wall of the tube 11. Analogously, as also schematically shown in FIG. 5, the temperature sensor 72 can be formed by means of a second temperature probe 721, which is also arranged within the intermediate space 100' and which is, for example, identical in design to the aforementioned temperature probe 711, and by means of a second coupling body 722 which couples said temperature probe 721 thermally conductively to the wall of the tube 12 and which is, for example, also identical in design to the aforementioned coupling body 712. Each of the two temperature probes 711, 721, which carry out the actual conversion of the (measuring point) temperature to be sensed into the respective measurement signal, can, for example, respectively be formed by means of a platinum measuring resistor, a thermistor or a thermocouple. Furthermore, each of the temperature probes 711, 721 can be connected to the respectively associated coupling body 712 or 722 by means of a suitable integral connection, namely, for example, an adhesive connection or a soldering or welding connection, and/or by embedding into the respective coupling body 712 or 722.

In order to achieve a mechanically stable and durable although thermally conductive connection between the wall of the tube and the temperature sensor 71, the latter is integrally connected according to another embodiment of the invention to the lateral surface 11 #of the wall of the tube 11, namely, for example, adhesively or by means of a soldering or welding connection. In order to produce such an integral connection between the tube 11 and the temperature sensor 71, a thermal adhesive, thus a plastic based on epoxy resin or based on silicone, namely, for example, silicone elastomer or a one-component or two-component silicone rubber, such as the company DELO Industrie Klebstoffe GmbH & Co KGaA, 86949 Windach, Germany, inter alia sells under the name DELO-GUM® 3699, can be used, for example. The plastic used to connect the temperature sensor 71 and the tube 11 can also be mixed with metal oxide particles in order to achieve as good a thermal conduction as possible. It is furthermore also possible to, partially or entirely, produce the aforementioned coupling body 712 from plastic, for example also such that a plastic molded part, which is placed between the temperature probe 711 and the wall or which contacts both the lateral surface 11 #of the wall and the temperature probe 711 and which is, where applicable, also monolithic, serves as coupling body 712 or the entire coupling body 712 consists of plastic, for example a plastic applied in one or more layers to the wall of the tube 11 and thus placed between the wall of the tube 11 and the first temperature probe 711. In addition, the temperature sensor 72 can also be likewise integrally connected to the lateral surface 11 #of the wall of the tube 11, namely, for example, adhesively or by means of a soldering or welding connection. For this purpose, the coupling body 722 consists according to another embodiment of the invention at least partially, for example also predominantly, of a metal; thus, the coupling body 722 can be produced from a material, a specific thermal conductivity λ2 of which is greater than 10 W/(m·K) or and/or a specific heat capacity cp722 of which is less than 1000 J/(kg·K), namely, for example, of the same material as the coupling body 712. The two aforementioned coupling bodies 712, 722 may furthermore be readily formed by appropriately selecting the materials actually used for their respective production such that the specific thermal conductivity λ722 of a material of the second coupling body 722 is equal to a specific thermal conductivity λ712 of a material of the coupling body 712 and/or the specific heat capacity cp722 of the material of the coupling body 722 is equal to a specific heat capacity cp712 of the material of the first coupling body 712.

According to another embodiment of the invention, the second coupling body 722 of the temperature sensor 72 is also at least partially produced from a plastic or formed by means of a plastic body correspondingly placed between the temperature probe 721 and the wall of the tube 11. Alternatively or additionally, a further embodiment of the present invention provides that the coupling body 721 of the temperature sensor 71, as also indicated in FIG. 6a, is formed by means of a disk, which is placed between the wall of the tube 11 and the temperature probe 721 and which consists of a metal or a metal alloy, for example steel, and that the coupling body 722 of the temperature sensor 72, as also indicated in FIG. 6b, is formed by means of such a disk, which is placed between the wall of the tube 11 and the temperature probe 721 and which consists of a metal or a metal alloy, for example steel. Each of the two aforementioned disks can be designed as a disk which is, for example, substantially annular or substantially rectangular, as also shown in 6a or 6b, and which has a through-opening respectively adapted to the lateral surface of the wall of the tube 11 and which is respectively pushed onto the tube 11 such that the disk surrounds said tube 11 or at least partially contacts an inner surface, facing the lateral surface of the wall of the tube 11, of the through-opening of said lateral surface 11 #. Each of the two aforementioned disks can, for example, respectively also serve both as coupling body 712 or 722 of the temperature sensor 71 or 72 or as part thereof and as a gusset plate inducing inlet-side or outlet-side vibration nodes of mechanical vibrations of the tube 11 or, for example, as a holder of the mentioned vibration sensor 51 or the also provided vibration sensor 52.

As schematically respectively shown in FIG. 4 or 5, each of the two temperature sensors is coupled thermally to the tube 11 in that the coupling body 712 of the temperature sensor 71 contacts the lateral surface 11 #of the wall of the tube 11, forming a first interface II21 of the second type, namely an interface between two solid phases, and the coupling body 722 of the temperature sensor 72 contacts the lateral surface 11 #of the wall of the tube 11, forming an interface II22 of the second type. Each of the two interfaces II21, II22 respectively has a surface area which is defined, thus predetermined, by the specific design of the respective coupling body 712 or 722. Accordingly, as also illustrated in a simplified manner in FIG. 7 by means of an equivalent circuit diagram for a resistor network formed by means of a plurality of discrete heat resistors, a first heat resistor R1 (R1=ΔT1/Q1), which in particular in this case is predominately determined by the thermal conduction and which is thermally conductively connected to the first temperature measuring point counteracts a heat flow Q1, which results from a temperature difference ΔT1 prevailing between the interface II21 of the second type and the first temperature measuring point and which nevertheless entirely passes through said interface II21 and flows further to the first temperature measuring point, and a second heat resistor R2 (R2=ΔT2/Q2), which is also predominately determined by the thermal conduction and which is thermally conductively connected to the second temperature measuring point counteracts a heat flow Q2, which results from a temperature difference ΔT2 prevailing between the interface II22 of the second type and the second temperature measuring point and which nevertheless entirely passes through said interface II22 and flows further to the second temperature measuring point. In order to achieve the best possible thermal coupling of the temperature sensor 71 and of the temperature sensor 72 to the wall of the tube 11, each of the heat resistors R1 and R2 or each of the temperature sensors 71, 72 is dimensioned according to a further embodiment of the invention such that each of the heat resistors R1 and R2 is respectively smaller than 1000 K/W, namely, for example, smaller than 25 K/W. According to a further embodiment of the invention, the two aforementioned heat resistors R1, R2 are furthermore dimensioned such that overall a condition R1=R2 is met, namely that both heat resistors R1, R2 are designed to be of the same size.

In order to achieve that each of the temperature sensors 71, 72, as also assumed in the (static) calculation model underlying the equivalent circuit diagram shown in FIG. 7, respectively has only a comparatively low, thus negligible thermal inertia or each of the two measuring point temperatures ϑ1, ϑ2 can respectively rapidly follow any changes of in each case a first tube wall temperature $\vartheta_{11}$, namely a local temperature assumed by the wall of the tube 11, or that vice versa, each of the two measuring point temperatures does not depend or in any case depends only slightly on a rate of change of the tube wall temperature $\vartheta_{11}$, namely a rate at which the tube wall temperature changes over time, a further embodiment of the invention furthermore provides that each of the coupling bodies 712 and 722 is respectively designed such that both the coupling body 712 and the coupling body 722 ultimately respectively have a heat capacity C1 or C2, which is less than 2000 J/K; this advantageously furthermore such that the heat capacity C1 of the first coupling body 712 and the heat capacity C2 of the second coupling body 722 satisfy a condition $$\frac{1}{1000} < \frac{C1}{C2} \leq 1$$

and/or that at least the coupling body 712 has a specific heat capacity that is less than 200 J/(kg·K) but possibly also less than 100 J/(kg·K). Due to the compact design typically desired for the temperature sensor of the type in question and due to the typically used, namely thermally conductive, materials, a close relation between the heat resistor and the heat capacity of the respective temperature sensor moreover exists such that the respective heat capacity, thus also the aforementioned heat capacity C1 or C2, is designed to be the lower, the lower the respective heat resistor is selected. Accordingly, dimensioning the heat resistors R1, R2 of the coupling bodies 712 or 722 in the aforementioned manner can thus at the same time also achieve that each of the temperature sensors 71, 72 respectively also has only a comparatively low thermal inertia with respect to the respective tube wall temperature $\vartheta_{11}$, $\vartheta_{12}$ or that each of the two measuring point temperatures ϑ1, ϑ2 can, as desired, respectively rapidly follow any changes of the respective tube wall temperature or vice versa, that each of the two measuring point temperatures ϑ1, ϑ2 does not depend or in any case depends only slightly on a rate of change of the tube wall temperature, namely a rate at which the respective tube wall temperature changes over time.

The intermediate space 100' formed between the inner surface 100+ of the wall of the transducer housing 100 and the lateral surfaces 11 #, 12# of the walls of the tube 11 or of the tube 12 is furthermore, as is quite common in transducer devices of the type in question and as respectively schematically indicated in FIG. 4 or 5 by dotted hatching, filled with a fluid FL2, which, for example, has a specific thermal conductivity λF of less than 1 W/(m·K), to form a fluid volume surrounding the tube 11. The fluid FL2 held in the intermediate space 100' or the fluid volume formed therewith has a fluid temperature, which is hereinafter referred to as tube ambient temperature $\vartheta_{FL2}$ and which optionally also changes over time and which at least temporarily deviates from the measurement fluid temperature $\vartheta_{FL1}$ by more than 1 K (Kelvin), in particular at least temporarily by more than 5 K. Accordingly, the transducer housing and the tube 11 according to another embodiment of the invention are designed to hold said fluid FL2 in the intermediate space 100' such that the lateral surface 11 #, facing the intermediate space 100', of the wall of the tube 11, forming a second interface II12 of the first type, is contacted by the fluid FL2 held in the intermediate space; the tube is thus thermally coupled to the fluid volume formed in the intermediate space 100'. Air or an inert gas, such as nitrogen, or a noble gas, for example, namely in particular helium can serve as the fluid FL2 As a result, an outer surface, facing the intermediate space 100', of the temperature sensor 71 is also contacted by the fluid FL2 held in the intermediate space, forming a third interface II13 of the first type (interface between a fluid and a solid phase) and an outer surface, also facing the intermediate space 100', of the temperature sensor 72 is contacted by the fluid FL2 held in the intermediate space, forming a fourth interface II14 of the first type, or both the temperature sensor 71 and the temperature sensor 72 are thermally coupled to the fluid volume formed in the intermediate space 100' such that, as also schematically illustrated in FIG. 7, a third heat resistor R3 (R3=ΔT3/Q3), which in particular is in this case defined by heat conduction and by the heat flow (convection) occurring at the interface II13 and which is thermally conductively connected to the first temperature measuring point, counteracts a heat flow Q3, which results from a temperature difference ΔT3 prevailing between the interface II13 of the first type and the first temperature measuring point and which in particular entirely flows from the first temperature measuring point to the interface II13, thus entirely passes through said interface II13, and a fourth heat resistor R4 (R4=ΔT4/Q4), which in particular is in this case also defined by heat conduction and by the heat flow occurring at the interface II14 and which is thermally conductively connected to the second temperature measuring point, counteracts a heat flow Q4, which results from a temperature difference ΔT4 prevailing between the interface II14 of the first type and the second temperature measuring point and which in particular entirely flows from the second temperature measuring point to the interface II14, thus entirely passes through said interface II14. Each of the heat resistors R3 and R4 is advantageously dimensioned to be less than 20,000 K/W, in particular less than 10,000 K/W. In order to achieve a thermal coupling of the temperature sensor 71 or the temperature sensor 72 to the fluid volume formed in the intermediate space 100', which is weaker in comparison to the thermal coupling to the tube 11, not least in order to also achieve that the measuring point temperature ϑ1 or ϑ2 respectively sensed therewith is as immune as possible against rapid temporal changes, which may also be spatially different, of the tube ambient temperature $\vartheta_{FL2}$ or that the temperature sensors 71, 72 preferably have a greater thermal inertia with respect to the tube ambient temperature $\vartheta_{FL2}$ than with respect to the tube wall temperature $\vartheta_{11}$ or $\vartheta_{12}$, the temperature sensor 71 or the temperature sensor 72 is furthermore designed according to a further embodiment of the invention such that the heat resistor R3 or the heat resistor R4 is more than 500 K/W, in particular more than 5000 K/W. According to a further embodiment of the invention, the two aforementioned heat resistors R3, R4 are furthermore dimensioned such that overall a condition R3=R4 is met, namely that both heat resistors R3, R4 are designed to be of the same size.

In order to also be able to predetermine the heat resistor R3 as easily as possible on the one hand but to also design said heat resistor R3 on the other hand such that its respective examples also have as small a spread as possible from transducer device to transducer device within a lot or a series of industrially manufactured transducer devices of the type in question, that the transducer device is thus well reproducible overall, the temperature sensor 71 can furthermore have a third coupling body, which couples the temperature probe 711 of said temperature sensor thermally to the fluid volume formed in the intermediate space and which contacts said fluid volume, forming the third interface II13 of the first type. Said coupling body can consist at least partially, namely in particular predominantly or entirely, of a material, a specific thermal conductivity of which is greater than the specific thermal conductivity λF of the fluid FL2 held in the intermediate space and/or is greater than 0.1 W/(m·K) and a specific heat capacity of which is smaller than a specific heat capacity cpF of the fluid FL2 held in the intermediate space and/or less than 2000 J/(kg·K). Advantageously, the material of the aforementioned coupling body can also be selected to match the fluid FL2 held in the intermediate space such that a ratio of the specific thermal conductivity of said material to the thermal conductivity λF of the fluid FL2 held in the intermediate space is greater than 0.2, and/or that a ratio of the specific heat capacity of said material to the heat capacity cpF of the fluid FL2 held in the intermediate space is less than 1.5. The third coupling body may be formed, for example also entirely, by means of a plastic, such as an epoxy resin or a silicone, which is applied to the temperature probe 711 of the temperature sensor 71 and which is, for example, also mixed with metal oxide particles. Alternatively or additionally, said third coupling body can be formed, where appropriate also entirely, by means of a fabric tape applied to the temperature sensor 711, for example a fiberglass fabric tape, or by means of a metal sheet applied to the temperature probe 711, such as a sheet metal strip of stainless steel. In the same way, the temperature sensor 72 can also be formed by means of a further fourth coupling body, which in particular couples the temperature probe 721 of said temperature sensor 72 thermally to the fluid volume formed in the intermediate space and which contacts the fluid volume formed in the intermediate space 100', forming the fourth interface II14 of the first type. In addition, the fourth coupling body can advantageously be identical in design to the aforementioned third coupling body of the temperature sensor 71 which couples the temperature probe 711 thermally to the fluid volume formed in the intermediate space 100'. Correspondingly, a fifth interface of the first type is also formed within the tube 11, namely on the inner surface 11+, facing its lumen and thus contacted by the fluid FL1 conducted in the lumen, of the wall of said tube, as a result of which the tube wall temperature $\vartheta_{11}$ of the tube 11 is also co-determined by the measurement fluid temperature $\vartheta_{FL1}$ of the fluid FL1 currently located in the lumen of the tube 11.

As already mentioned, each of the aforementioned heat resistors R1, R2, R3 and R4 is respectively significantly or completely defined by material characteristic values, such as a specific thermal conductivity λ, and dimensions of the respective coupling body or the wall of the tube, such as a respective effective length $L_{th}$ of the respective coupling body for the respective heat flow flowing through and a surface area $A_{th}$ of a respective effective cross-sectional area of the respective coupling body for said heat flow, namely, for example, the surface area of the respective interfaces II21, II22, and/or by corresponding material characteristic values of the wall of the tube 11 or of the fluid FL2 held in the intermediate space 100', thus solely by parameters that are at least approximately known in advance and at the same time substantially unchanging over a longer operating period. Thus, each of the heat resistors R1, R2, R3, R4 can be sufficiently precisely determined in advance by means of said parameters (λ, $A_{th}$, $L_{th}$), for example by experimental measurements and/or by calculations. For example, based on the known relation:

$$R_{th} = \frac{L_{eff}}{\lambda \cdot A_{eff}} \quad (1)$$

a thermal resistivity, which co-determines the heat resistor R1 or R2 and which in particular represents a temperature drop related to a heat flow due to heat conduction processes, can in particular be quantified, namely, for example, be calculated for a unit K/W (Kelvin per Watt). Knowing the material characteristic values of the materials actually respectively used to produce the temperature sensors and the actual shape and dimension of the aforementioned interfaces II13, II14, II21, II22 formed by means of the temperature sensors, the resistance values for the aforementioned heat transfer resistances respectively co-determining the heat resistors R1, R2, R3, R4 can also be sufficiently precisely specified or sufficiently precisely determined in advance.

Alternatively or additionally, the heat resistors R1, R2, R3, R4 or corresponding heat resistance ratios can also, for example, be experimentally determined by means of calibration measurements taken at the respective transducer device.

In order to on the one hand provide the temperature sensor 71 with as low a thermal inertia as possible with respect to temporal changes of the tube wall temperature of the tube 11 but to on the other hand also achieve as good a thermal coupling of the temperature sensor 71 to the wall of the tube as possible with as compact a design as possible, the coupling body 712 according to a further embodiment of the invention is produced at least partially, for example also predominantly or entirely, from a material, namely, for example, a thermally adhesive one, a specific thermal conductivity $\lambda 712$ of which is greater than a specific thermal conductivity $\lambda F$ of the fluid FL2 held in the intermediate space and/or greater than 1 W/(m·K). Advantageously, the material of the coupling body 712 is in this case furthermore selected such that a ratio $\lambda 712/\lambda F$ of the specific thermal conductivity $\lambda 712$ of said material of the coupling body 712 to the specific thermal conductivity $\lambda F$ of the fluid FL2 held in the intermediate space is greater than 2, and/or a ratio cp712/cpF of a specific heat capacity cp712 of said material of the coupling body 712 to the heat capacity cpF of the fluid FL2 held in the intermediate space is less than 1.5, in particular such that the specific heat capacity cp712 is less than a specific heat capacity cpF of the fluid held in the intermediate space. In addition, the coupling body 722 of the temperature sensor 72 can also at least partially (or entirely) be produced from the same material as the coupling body 712 of the temperature sensor 71 in order to provide an equally low thermal inertia of the temperature sensor 72 with respect to temporal changes of the tube wall temperature of the tube 11 and in order to achieve an equally good thermal coupling of the temperature sensor 72 to the wall of the tube 11. A further embodiment of the invention furthermore provides that the first temperature sensor and the second temperature sensor are identical in design, namely that both the temperature sensors and coupling bodies respectively used for this purpose and the thermal coupling of the aforementioned components to one another or to the tube and the fluid held in the intermediate space are essentially the same.

For the purpose of processing or evaluation of the aforementioned measurement signals generated by means of the transducer device, the measuring and operation electronics unit ME is, as also schematically shown in FIG. 3, respectively electrically connected both to each of the at least two vibration sensors 51, 52 and to each of the two temperature sensors 71, 72 and to the at least one vibration exciter 41, for example in each case by means of corresponding connecting wires. In order to reduce the expenditure for the electrical connection of the temperature sensors of the transducer device to the measuring and operation electronics unit ME or in order to allow an easy cabling of the measuring and operation electronics unit ME to said temperature sensors, the measuring and operation electronics unit ME according to a further embodiment of the invention has, as also shown in FIG. 6, a multiplexer with at least two signal inputs and at least one signal output as well as an analog-to-digital converter ADC, which has a, for example nominal, resolution of more than 16 bits and/or is clocked with a sampling rate of more than 1000 s⁻ and has at least one signal input and at least one signal output. Said multiplexer MUX is in particular designed to, optionally, namely, for example, cyclically, switch one of its signal inputs through to the signal output such that a signal applied to the respectively switched-through signal input is passed to the signal output, while the analog-to-digital converter ADC is designed to convert an analog input signal applied to said signal input into a digital output signal representing said input signal using a sampling rate $f_A$ of, for example, in particular more than 1000 s⁻ and a digital resolution N of, for example, more than 16 bits and to provide the output signal at the signal output. As also indicated in FIG. 6, the at least one signal output of the multiplexer and the at least one signal input of the analog-to-digital converter are moreover electrically coupled to each other, and the temperature sensor 71 and the temperature sensor 72 are respectively electrically connected to the multiplexer MUX such that the temperature measurement signal θ1 is applied to a first signal input of the multiplexer MUX and that the temperature measurement signal θ2 is applied to a second signal input of the multiplexer MUX. As a result, the output signal of the analog-to-digital converter ADC temporarily represents exactly one of the two temperature measurement signals θ1, θ2 during operation. Furthermore, the measuring and operation electronics unit ME may furthermore be designed to generate the transducer temperature measurement value using said output signal of the analog-to-digital converter ADC representing one of the two temperature measurement signals 81, 82.

The measuring and operation electronics unit ME is also designed to generate an exciter signal e, which drives the exciter arrangement E, namely, for example, its at least one vibration exciter 41, and which is, for example, adjusted to a predetermined voltage level and/or to a predetermined current intensity and/or to a predetermined frequency, and which has an excitation frequency, namely a signal frequency corresponding to the useful frequency, or to feed electrical power into the at least one vibration exciter 41 in order to effect mechanical vibrations of the tube 11 by means of said electrical exciter signal e1. Said exciter signal e1 serves in particular to feed at least the electrical power required for exciting or maintaining the useful vibrations to the at least one vibration exciter in a controlled manner and can accordingly have a signal frequency corresponding to an (instantaneous) resonant frequency of the useful mode, thus to the useful frequency. For example, the exciter signal e can simultaneously also have a multiplicity of sinusoidal signal components having a different signal frequency from one another, of which one signal component, for example a signal component dominating at least temporarily with respect to signal power, has the signal frequency corresponding to the useful frequency.

In addition, the exciter arrangement E is designed to excite or maintain mechanical vibrations of the at least one tube 11 when driven by said exciter signal e. In the process, the at least one vibration exciter converts an electrical excitation power fed by means of the electrical exciter signal into excitation forces, which are, for example, pulsating or harmonic, namely essentially sinusoidal, and which act accordingly on the tube and thus actively excite the desired useful vibrations. The excitation forces ultimately generated by converting electrical excitation power fed into the vibration exciter can be generated accordingly in a manner known per se to the person skilled in the art, namely by means of a driver circuit which is provided in the measuring and operation electronics unit ME and which adjusts the exciter signal on the basis of signal frequency and signal amplitude of the at least one sensor signal and provides it via an output channel. In order to determine the instantaneous resonant frequency of the useful mode or to adjust the signal frequency corresponding to the useful frequency for the exciter signal, a digital phase-locked loop (PLL) can, for example, be provided in the driver circuit, while a current intensity of the exciter signal, which determines a magnitude of said excitation forces, can, for example, be appropriately adjusted by means of a corresponding current controller of the driver circuit. The measuring device electronics unit ME can in this case, for example, also be designed to control the exciter signal such that the useful vibrations have a constant amplitude, which is thus also largely independent of the density ρ or the viscosity η of the medium to be respectively measured. In order to generate the aforementioned exciter signal, a corresponding driver circuit Exc, namely, for example, a driver circuit designed as an independent electronics module, can furthermore be provided in the measuring and operation electronics unit ME, as is quite common in such measuring and operation electronics units or as also indicated in FIG. 2. The design and the use of so-called phase-locked loops to actively excite vibration elements of the type in question at an instantaneous resonant frequency is, for example, comprehensively described in U.S. Pat. No. 4,801,897. Other driver circuits which are suitable for adjusting the excitation energy or the excitation power and which are known per se to the person skilled in the art, for example also from the aforementioned U.S. Pat. Nos. 4,801,897, 5,024,104, or 6,311,136, can naturally also be used.

The measuring and operation electronics unit ME is furthermore also designed to receive and process the two vibration measurement signals s1, s2 and the two temperature measurement signals θ1, θ2 and to generate, using each of the two vibration signals s1, s2 and each of the temperature measurement signals 81, 82, a mass flow measurement value $X_m$, namely a measurement value ($x_x \rightarrow x_m$) representing a mass flow rate m of a fluid flowing through the tube 11 and/or through the tube 12, or a mass flow sequence $X_m$, namely a series of temporally successive mass flow measurement values $x_{m,i}$ respectively instantaneously representing the mass flow rate m of the fluid. For this purpose, as is quite common for such measuring and operation electronics units or as also indicated in FIG. 2, a corresponding measuring and evaluation circuit μC, which may, optionally, also be electrically connected to the aforementioned driver circuit Exc and which is, for example, also designed as an independent electronics module and/or comprises at least one microprocessor, can furthermore be provided in the measuring and operation electronics unit ME. In the measuring system according to the invention, the measuring and operation electronics unit ME is in particular provided or designed to generate the aforementioned mass flow measurement values $x_{m,i}$ such that, at least for one reference mass flow rate $m_{ref}$, namely a predetermined mass flow rate of a reference fluid flowing through the transducer device, namely, for example, a liquid or a gas, the mass flow measurement values $x_{m,i}$ ($x_{m,i} \rightarrow x_{m,ref}$) are independent of the aforementioned temperature difference Δϑ between the two temperature measuring points; this in particular such that in particular for at least one reference mass flow rate $m_{ref}$, which is not zero although constant, temporally successively determined mass flow measurement values $x_{m,i}$ ($x_{m,i} \rightarrow x_{m,ref}$) deviate from each other by no more than 0.01% of said reference mass flow rate $m_{ref}$ even in the case of various temperature differences Δϑ, namely in particular temperature differences of more than 1 K and/or less than 10 K and/or temperature differences spreading over time with a range of more than 1 K and/or temperature differences changing over time with a rate of change of more than 0.05 K/s, and/or that in particular respectively in the case of a transducer device through which no fluid flows, temporally successively determined mass flow measurement values $x_{m,i}$ ($x_{m,i} \rightarrow x_{m,ref}$) are less than 0.01 kg/h or deviate from each other by less than 0.01 kg/h even in the case of various temperature differences, namely in particular temperature differences of more than 1 K and/or less than 10 K and/or temperature differences spreading over time with a range of more than 1 K and/or less than 10 K and/or temperature differences changing over time with a rate of change of more than 0.05 K/s.

The aforementioned reference mass flow rate $m_{ref}$ can, for example, be adjusted during a (wet) calibration of the measuring system with the reference fluid using a calibrated reference measuring system, for example before its delivery on a manufacturer's calibration system and/or also, as also shown inter alia in the aforementioned WO-A 02/097379, in the installation position on site. For the aforementioned case in which the reference fluid flows through the transducer device with a reference mass flow rate $m_{ref}$ not equal to zero, the fluid flow can advantageously be designed to be laminar, not least in order to establish the aforementioned temperature difference, or the reference fluid can advantageously flow through the transducer device with a Reynolds number (Re) of less than 1000. The aforementioned reference mass flow rate $m_{ref}$ can accordingly, for example, be a mass flow rate of no more than 1 kg/h and/or a mass flow rate kept constant. However, the reference mass flow rate $m_{ref}$ can also be zero so that the mass flow measurement values $x_{m,i}$ ($x_{m,i} \rightarrow x_{m,ref} \circledR X_{m,ZERO}$) determined for it represent a zero scale mark of the measuring and operation electronics unit ME. Not least in order to establish the aforementioned temperature difference, the reference fluid may advantageously be, for example, a gas or a liquid having a specific heat capacity $c_{p,ref}$ of more than 1 kJ·kg$^{-1}$·K$^{-1}$ and/or less than 4.2 kJ·kg$^{-1}$·K$^{-1}$ and/or a fluid which is introduced into the tube 11 or the transducer device formed therewith with a fluid temperature of no less than 20° C. The reference fluid can thus, for example, be an oil, in particular an oil having a viscosity of more than 10$^{-2}$ Pa·s (pascal seconds). Particularly pronounced temperature differences Δϑ can in this case be determined if the respective reference mass flow rate $m_{ref}$ is, depending on a magnitude |D| of the nominal width of the transducer device given in the SI base unit for length (m=meters), less than |D|·10000 kg/h. However, the reference fluid can, for example, also be water or, for example, also air, wherein considerable temperature differences Δϑ can already be established in this case for reference mass flow rates $m_{ref}$ of less than |D|·000 kg/h.

According to a further embodiment of the invention, the measuring and operation electronics unit ME is designed to determine the mass flow measurement values $x_{m,i}$ based on the following polynomial function containing in particular N temperature difference coefficients $K_j$:

$$x_{m,ref} = C_0 \cdot \Delta\varphi + \sum_{j=0}^{N} K_j \cdot (\Delta\vartheta)^j = C_0 \cdot \Delta\varphi + \sum_{j=0}^{N} K_j \cdot (\vartheta 1 - \vartheta 2)^j \quad (2)$$

with $j = 0, 1, 2, \ldots N$ or to determine the mass flow measurement values $x_{m,i}$ such that a mass flow measurement value $x_{m,ref}$ determined for the reference mass flow rate $m_{ref}$ satisfies at least one condition corresponding to said polynomial function. The measuring and operation electronics unit ME may in particular be designed to determine the aforementioned mass flow measurement values $x_{m,i}$ such that in the case of a transducer device through which no fluid flows or a first tube through which no fluid flows, temporally successively determined mass flow measurement values $x_{m,i}$ ($x_{m,i} \to x_{m,ZERO}$) respectively representing in particular a zero scale mark $x_{m,ZERO}$ of the measuring and operation electronics unit ME corresponding to a mass flow rate m of zero ($m_{ref}=0$) satisfy a condition:

$$C_0 \cdot \Delta\varphi + \sum_{j=0}^{N} K_j \cdot (\Delta\vartheta)^j = C_0 \cdot \Delta\varphi + \sum_{j=0}^{N} K_j \cdot (\vartheta 1 - \vartheta 2)^j \leq 0.01 \text{ kg/h} \quad (3)$$

with $j = 0, 1, 2, \ldots N$ namely in particular a condition:

$$C_0 \cdot \Delta\varphi + \sum_{j=0}^{N} K_j \cdot (\Delta\vartheta)^j = C_0 \cdot \Delta\varphi + \sum_{j=0}^{N} K_j \cdot (\vartheta 1 - \vartheta 2)^j \approx 0. \quad (4)$$

Said temperature difference coefficients $K_j$ can be experimentally determined in advance for the respective measuring system, for example within the course of the aforementioned (wet) calibration of the measuring system by calibrating the respective measuring system at various temperature differences and/or various (reference) mass flow rates and/or by means of computer-based simulations, for example, by adapting the polynomial function or its temperature difference coefficients $K_j$ to experimentally determined measurement and/or simulation data, for example in accordance with the least squares method (LS method). Further studies in this respect have shown that for numerous applications, the number of temperature difference coefficients in the aforementioned polynomial function can easily be limited to N≤3 or a polynomial order can accordingly be limited to two or one. It could moreover be found that it can be sufficient for most transducer devices or transducer device types to transfer the temperature coefficients $K_j$ of the polynomial function, which were initially experimentally determined representatively for a single transducer device, to other identically designed transducer devices so that said identically designed transducer devices do not need to be recalibrated with respect to the polynomial function, significantly reducing the calibration effort.

Not least in order to implement the aforementioned polynomial function, the measuring and operation electronics unit ME according to a further embodiment of the invention is furthermore designed to generate, using both the temperature measurement signal θ1 and the temperature measurement signal θ2, a temperature difference sequence $X_{\Delta\vartheta,i}$, namely a series of temporally successive temperature difference measurement values $x_{\Delta\vartheta,i}$ respectively representing the temperature difference Δϑ, and/or the measuring and operation electronics unit ME is designed to generate, using both the vibration signal s1 and the vibration signal s2 in a manner known per se to the person skilled in the art, a phase difference sequence $x_{\Delta\varphi,i}$, namely a series of temporally successive (conventional) phase difference measurement values $x_{\Delta\varphi,i}$ respectively representing the phase difference Δφ. Using both the phase difference sequence $X_{\Delta\varphi,i}$ and the temperature difference sequence $X_{\Delta\vartheta,i}$, the aforementioned mass flow sequence $X_m$ can be generated continuously, for example based on a calculation rule corresponding to the aforementioned polynomial function:

$$x_{m,i} = C_0 \cdot x_{\Delta\varphi,i} + \sum_{j=0}^{N} K_j \cdot (x_{\Delta\vartheta,i})^j \text{ with } j = 0, 1, 2, \ldots \quad (5)$$

The calculation of the respective (instantaneous) temperature difference measurement value $x_{\Delta\vartheta}$ can, for example, take place such that both a first measuring point temperature measurement value representing the measuring point temperature ϑ1 is generated based on the temperature measurement signal θ1 and a second measuring point temperature measurement value representing the measuring point temperature ϑ2 is generated based on the temperature measurement signal θ2 by means of the measuring and operation electronics unit ME at time intervals and that said temperature difference measurement value $x_{\Delta\vartheta}$ corresponds to a simple numerical subtraction of said two currently determined measuring point temperature measurement values. Additionally, the measuring and operation electronics unit ME can furthermore also be designed to monitor, using the temperature difference sequence $X_{\Delta\vartheta,i}$, a functionality of the transducer device, namely in particular a functionality of the tube 11; for example, it can be diagnosed by means of the measuring and operation electronics unit ME, using the temperature difference sequence $X_{\Delta\vartheta,i}$, whether or that the tube 11 or the transducer device formed therewith has a flow resistance which is changed in comparison to an original flow resistance or, optionally, to generate, using the temperature difference sequence $X_{\Delta\vartheta,i}$, an alarm, which signals an only limited functionality of the transducer device, namely, for example, as a result of the aforementioned changed flow resistance of the tube 11.

According to a further embodiment of the invention, the measuring and operation electronics unit ME is furthermore designed to (recurrently) generate, using both the temperature measurement signal θ1 and the temperature measurement signal θ2, a transducer temperature measurement value $X_\Theta$, which represents a transducer device temperature $\vartheta_{MW}$, which deviates both from the measuring point temperature ϑ1 and from the measuring point temperature ϑ2 but also from the aforementioned temperature difference Δϑ such that a magnitude of said transducer temperature measurement value $X_\Theta$ corresponds to a weighted average of the measuring point temperatures ϑ1, ϑ2 calculated, for example, according to the formula:

$$\frac{\alpha \cdot \vartheta 1 + \beta \cdot \vartheta 2}{\alpha + \beta}.$$

The calculation of the transducer temperature measurement value $X_\Theta$ can, for example, take place such that first both a first measuring point temperature measurement value $X_1$ representing the measuring point temperature θ1 is generated based on the temperature measurement signal θ1 and a second measuring point temperature measurement value $X_2$ representing the measuring point temperature ϑ2 is generated based on the temperature measurement signal θ2 and that said transducer temperature measurement value is determined according to a calculation rule dependent on the measuring point temperature measurement values $X_1$, $X_2$ and on previously determined numerical fixed values α, β stored in the measuring and operation electronics unit ME:

$$X_\Theta = \alpha \cdot X_{\theta 1} + \beta \cdot X_{\theta 2} \text{ or} \quad (6)$$

$$X_\Theta = \frac{\alpha \cdot X_{\theta 1} + \beta \cdot X_{\theta 2}}{\alpha + \beta}. \quad (7)$$

If only two measuring point temperature measurement values determined based on the temperature measurement signals are simultaneously used, the fixed values α, β contained in the aforementioned condition can advantageously also be selected such that the condition α+β=1 is satisfied as a result; this in particular also such that the condition α=β=0.5 is satisfied, the measuring point temperatures ϑ1, ϑ2 thus having the same weight in the measurement result or the transducer temperature measurement value $X_\Theta$ thus corresponding to an arithmetic mean 0.5·(ϑ1+ ϑ2) of the measuring point temperatures ϑ1, ϑ2. For the mentioned case, in which the two temperature sensors 71, 72 are identical in design and in which the design of the temperature sensor arrangement of the transducer device is axially symmetric with respect to the aforementioned imaginary symmetry axis, the transducer temperature temperature measurement value $X_\Theta$ accordingly represents an average tube wall temperature $\bar{\vartheta}_{11}$ of the tube 11. However, if necessary, the fixed values α, β can also be defined for this purpose, modifying the aforementioned condition α=β=0.5, in such a way, namely, for example, be finely adjusted based on corresponding calibration measurements at the transducer device, that the thereby ultimately determined transducer temperature measurement value at least actually more precisely corresponds to said average tube wall temperature $\bar{\vartheta}_{11}$ of the tube 11 than when said condition α=β=0.5 is applied.

For the other mentioned case, in which the measuring system is furthermore also provided to measure the measurement fluid temperature $\vartheta_{FL1}$, the measuring and operation electronics unit ME is furthermore designed to occasionally also determine, based on the two temperature measurement signals θ1, θ2, a measurement fluid temperature measurement value $x_\theta$, which represents said measurement fluid temperature $\vartheta_{FL1}$. The measurement fluid temperature measurement value $x_\theta$ can, for example, be determined very easily using a calculation rule that is changed in comparison to one of the aforementioned calculation rules (5), (6) only by a coefficient $K_{FL}$, which is, for example, firmly specified:

$$X_{\Theta,FL} = \alpha \cdot X_{\theta 1} + \beta \cdot X_{\theta 2} + K_{FL} \text{ or} \qquad (8)$$

$$X_{\Theta,FL} = \frac{\alpha \cdot X_{\theta 1} + \beta \cdot X_{\theta 2}}{\alpha + \beta} + K_{FL} \qquad (9)$$

wherein said coefficient KFL represents a temperature difference between the measured transducer device temperature $\vartheta_{MW}$ and the simultaneously occurring measurement fluid temperature $\vartheta_{FL1}$, in particular a steady temperature difference which always arises when the transducer device is in a thermal equilibrium and which can thus be determined in advance.

According to another embodiment of the invention, the measuring and operation electronics unit ME is furthermore designed to generate, using the temperature measurement signal θ1 although not the temperature measurement signal θ2 or using the temperature measurement signal θ2 although not the temperature measurement signal θ1, an auxiliary temperature measurement value $X_{\Theta,MW}^*$, which at least approximately represents the transducer device temperature. As a result, even, for example, in the case that precisely one of the two temperature sensors 71, 72 is defective and/or is disconnected from the measuring and operation electronics unit ME, for example as a result of a failure of one of the aforementioned connecting lines, a measurement value for the transducer device temperature can nevertheless be determined and be output as an alternative to the transducer temperature measurement value $X_{\Theta,MW}$. In addition, the measuring and operation electronics unit ME can furthermore also be designed to generate, using the temperature measurement signal θ1 although not the temperature measurement signal θ2 or using the temperature measurement signal θ2 although not the temperature measurement signal θ1, a (further) auxiliary temperature measurement value $X_{\Theta,FL}^*$, which at least approximately represents the measurement fluid temperature, and to optionally output said auxiliary temperature measurement value $X_{\Theta,FL}^*$ as an alternative to the measurement fluid temperature measurement value $X_{\Theta,FL}$. Alternatively or additionally, the measuring and operation electronics unit ME can also be designed to detect the aforementioned defect of one of the temperature sensors 71, 72 or the aforementioned disconnection of one of the temperature sensors 71, 72 from the measuring and operation electronics unit ME and to optionally report it, for example in the form of a maintenance message.

In addition, as already mentioned, the measuring system can also furthermore be designed to measure a density and/or a viscosity of the medium based on a useful signal component at least of one of the vibration signals and/or based on the exciter signal, for example. For this purpose, the measuring and operation electronics unit ME according to a further embodiment of the invention is furthermore designed to recurrently generate, using at least one of the vibration signals s1, s2, a frequency measurement value $x_f$, which represents a frequency of the mechanical vibrations of the tube 11; this in particular such that, using the vibration signal, a useful frequency, namely a vibration frequency of the useful vibrations dependent on the measurement variable to be measured, is determined and the frequency measurement value $x_f$ represents said useful frequency. As already mentioned and as is quite common in vibronic measuring systems of the type in question, as useful frequency can be selected one of the resonant frequencies respectively inherent in the fluid-carrying tubes, namely, for example, a resonant frequency of a bending vibration mode of the tubes. In addition, the measuring and operation electronics unit ME according to another embodiment of the invention is designed to generate at least one further measurement value using at least the frequency measurement value. Said measurement value generated by means of the frequency measurement value $x_f$ can, for example, be a density measurement value $x_\rho$ representing the density ρ of the fluid FL1 and/or a viscosity measurement value $x_\eta$ representing the viscosity η of the fluid FL1. The measuring and operation electronics unit ME according to another embodiment of the invention is furthermore designed to also generate the at least one density measurement value $X_\rho$ and/or the at least one viscosity measurement value $x_\eta$ using both the temperature measurement signal θ1 generated by means of the transducer device and at least the temperature measurement signal θ2 generated by means of the transducer device.

In order to compensate any transverse forces generated by the vibrating tube 11 and possibly also dependent on the density, the transducer device can furthermore comprise a counter-vibrator also is caused to vibrate during operation, namely, for example, mirror-invertedly to the aforementioned useful vibrations. Said counter-vibrator may be formed, for example, by means of a solid rod or plate or, for example, also by means of a tube that is identical in design to the tube 11 and/or parallel to the tube 11. According to a further development of the invention, the transducer device is equipped with at least a second tube 12, which comprises a lumen 12' surrounded by a wall and which is, for example, at least in sections curved and/or at least in sections straight. Said tube 12 extends, as inter alia indicated in FIG. 2, from an inlet-side first end 12a to an outlet-side second end 12b. The tube 12 may, as also indicated in FIG. 2, 3a or 3b or readily apparent in the combination, be identical in design to the tube 11 and/or be arranged parallelly to the first tube 11. According to a further embodiment of the invention, said tube 12 is also provided or designed to be flowed through at least by a partial volume of the fluid FL1 from the end 12a toward the end 12b and in the process is caused to vibrate; this in particular such that each of the tubes 11, 12, which are, for example, identical in design, is caused to vibrate simultaneously and/or mirror-invertedly. The at least two tubes 11, 12 may, for example, be connected fluidically to each other so as to form serial flow paths such that the tube 11 with its second end 11b is connected to the first end 12a of the tube 12. However, as is quite common in transducer devices of the type in question, the tubes 11, 12 can also be connected fluidically to each other so as to form two parallel flow paths. To this end, the transducer device according to another embodiment of the invention furthermore comprises an inlet-side first flow divider $20_1$ and an outlet-side second flow divider $20_2$, wherein both the second tube 11 and the tube 12, forming fluidically parallelly connected flow paths, are connected to the flow dividers $20_1$, $20_2$ which are, for example, identical in design, such that the tube 11 opens with its end 11a into a first flow opening $20_{1A}$ of the flow divider $20_1$ and with its end 11b into a first flow opening $20_{2A}$ of the flow divider $20_2$, and that the tube 12 opens with its end 12a into a second flow opening $20_{1B}$ of the flow divider $20_1$ and with its end 12b into a second flow opening $20_{2B}$ of the flow divider $20_2$. For this case, mounting further temperature sensors on the tube 12 can also be omitted, where applicable, so that the transducer device needs or has no other temperature sensors mounted on one of the tubes 11, 12 than the two temperature sensors 71, 72. For the other aforementioned case, in which the tubes 11, 12 are accommodated within a transducer housing 100, both the flow divider $20_1$ and the flow divider $20_2$ can respectively be an integral component of said transducer housing, for example such that, as also illustrated schematically in FIG. 2, a first end of the transducer housing is formed by means of the flow divider $20_1$ and a second end of the transducer housing remote from the first end of the transducer housing is formed by means of the flow divider $20_2$.

The invention claimed is:

1. A vibronic measuring system for measuring a mass flow rate, m, of a fluid (FL1), in particular a fluid flowing in a pipeline, said measuring system comprising:
   a measuring and operation electronics unit (ME);
   and a transducer device electrically coupled to said measuring and operation electronics unit (ME),
   wherein the transducer device (MW) comprises:
      a first tube (11) which comprises a lumen (11') surrounded by a wall and which extends from an inlet-side first end (11a) to an outlet-side second end (11b) and which is provided or designed to be flowed through at least by a partial volume of the fluid (FL1) from the inlet-side first end toward the outlet-side second end and in the process is caused to vibrate;
      a first temperature sensor (71) which is coupled thermally conductively to the wall of the first tube and which is positioned less far from the first end (11a) of the first tube (11) than from the second end (11b) of said first tube (11)
      and which is provided or designed to sense a first measuring point temperature ($\vartheta1$), namely a temperature of the wall of the first tube at an inlet-side first temperature measuring point formed by means of said temperature sensor (71) and to convert it into a first temperature measurement signal ($\theta1$), namely a first electrical measurement signal representing the first measuring point temperature ($\vartheta1$);
      a second temperature sensor (72) which is thermally conductively coupled to the wall of the first tube which is identical in design to the first temperature sensor (71), and
      which is positioned less far from the second end (11b) of the first tube (11) than from the first end (11a) of said first tube (11)
      and which is provided or designed to sense a second measuring point temperature ($\vartheta2$), namely a temperature of the wall of the first tube at a second temperature measuring point formed by means of said temperature sensor (72) and remote from the first temperature measuring point and/or on the outlet side, and to convert it into a second temperature measurement signal ($\theta2$), namely a second electrical measurement signal representing the second measuring point temperature ($\vartheta2$);
      at least one vibration exciter (41) for exciting and maintaining mechanical vibrations of the first tube about an associated static rest position;
      a first vibration sensor (51) for sensing mechanical vibrations of the first tube (11)
      which is positioned less far from the first end (11a) of the first tube (11) than from the second end (11b) of said first tube (11)
      and which is provided or designed to sense vibration movements of the first tube at an inlet-side first vibration measuring point formed by means of said vibration sensor (51) and to generate a first vibration signal (s1) representing said vibration movements;
      and at least one second vibration sensor (52) for sensing mechanical vibrations of the first tube (11)
      which is positioned less far from the second end (11b) of the first tube (11) than from the first end (11a) of said first tube (11)
      and which is provided or designed to sense vibration movements of the first tube at an outlet-side second vibration measuring point formed by means of said vibration sensor (52) and to generate a second vibration signal (s2) representing said vibration movements such that between the first vibration signal (s1) and said second vibration signal (s2) there exists a phase difference ($\Delta\varphi$) which depends on both the mass flow rate, m, and a temperature difference (As) established between a temperature of the first vibration sensor (51) and a temperature of said second vibration sensor (52);
   wherein the measuring and operation electronics unit (ME) is electrically connected both to each of the first and second vibration sensors (51, 52) and to each of the first and second temperature sensors (71, 72) and also to the at least one vibration exciter (41);
   wherein the measuring and operation electronics unit (ME) is designed to feed electrical power into the at least one vibration exciter (41) in order to effect mechanical vibrations of the first tube (11) by means of an electrical exciter signal (e1);
   and wherein the measuring and operation electronics unit (ME) is designed to generate, using each of the first and second vibration signals (s1, s2) as well as each of the first and second temperature measurement signals (θ1, θ2), a mass flow sequence ($X_m$), namely a series of temporally successive mass flow measurement values ($x_{m,i}$) respectively instantaneously representing the mass flow rate, m, of the fluid such
that the mass flow measurement values ($x_{m,i} \rightarrow x_{m,ref}$) at least for a reference mass flow rate ($m_{ref}$), namely a specified mass flow rate of a reference fluid, which flows through the transducer device are independent of the temperature difference (Δϑ).

2. The vibronic measuring system according to claim 1, wherein the measuring and operation electronics unit (ME) is designed to determine the mass flow measurement values ($x_{m,i}$) such that a mass flow measurement value ($x_{m,ref}$) determined for the reference mass flow rate ($m_{ref}$) satisfies a condition:

$$x_{m,ref} = C_0 \cdot \Delta\varphi + \sum_{j=0}^{N} K_j \cdot (\Delta\vartheta)^j = C_0 \cdot \Delta\varphi + \sum_{j=0}^{N} K_j \cdot (\vartheta 1 - \vartheta 2)^j$$

with j = 0, 1, 2, ... N and/or
wherein the measuring and operation electronics unit (ME) is designed to determine the mass flow measurement values ($x_{m,i}$) such that in case of a transducer device through which no fluid flows or a first tube through which no fluid flows, temporally successively determined mass flow measurement values ($x_{m,i} \rightarrow x_{m,ZERO}$) respectively satisfy a condition:

$$C_0 \cdot \Delta\varphi + \sum_{j=0}^{N} K_j \cdot (\Delta\vartheta)^j = C_0 \cdot \Delta\varphi + \sum_{j=0}^{N} K_j \cdot (\vartheta 1 - \vartheta 2)^j \leq 0.01 \text{ kg/h}$$

with j = 0, 1, 2, ... N and/or
wherein the measuring and operation electronics (ME) is designed to generate, using at least one of the vibration signals (s1, s2) and at least one of the temperature measurement signals (θ1, θ2), a density measurement value ($X_\rho$) which represents a density of the fluid (FL1); and/or
wherein the measuring and operation electronics unit (ME) is designed to generate, using at least one of the vibration signals (s1, s2) and at least one of the temperature measurement signals (θ1, θ2), a viscosity measurement value ($X_\eta$) which represents a viscosity of the fluid (FL1); and/or
wherein the measuring and operation electronics unit (ME) is designed to generate, using both the first temperature measurement signal (θ1) and the second temperature measurement signal (θ2), a measurement fluid temperature measurement value, namely a measurement value representing a temperature of a fluid flowing through the first tube.

3. The vibronic measuring system according to claim 1, wherein the reference fluid is water.

4. The vibronic measuring system according to claim 3, wherein the reference mass flow ($m_{ref}$) is, depending on a magnitude |D| of a caliber (D) of the first tube given in the SI base unit for length (m=meters), less than |D|·10000 kg/h.

5. The vibronic measuring system according to claim 1, wherein the reference fluid is an oil.

6. The vibronic measuring system according to claim 1, wherein the reference fluid is a gas.

7. The vibronic measuring system according to claim 6, wherein the reference mass flow rate ($m_{ref}$) is, depending on a magnitude |D| of a caliber (D) of the first tube given in the SI base unit for length (m=meters), less than |D|·1000 kg/h.

8. The vibronic measuring system according to claim 1,
wherein the temperature difference (Δϑ) is also established in the case of an intact transducer device or intact first tube; and/or
wherein the temperature difference (Δϑ) is greater in the case of an inside, facing the lumen, of a wall with an undesired deposition than in the case of an intact first tube, in particular with walls without deposition.

9. The vibronic measuring system according to claim 1, wherein the measuring and operation electronics unit (ME) is designed to generate, using both the temperature measurement signal (θ1) and the temperature measurement signal (θ2), a temperature difference sequence ($X_{\Delta\vartheta,i}$), namely a series of temporally successive temperature difference measurement values ($X_{\Delta\vartheta,i}$) respectively representing the temperature difference (Δϑ).

10. The vibronic measuring system according to claim 9, wherein the measuring and operation electronics unit (ME) is designed to generate the mass flow sequence ($X_m$) using both the phase difference sequence ($X_{\Delta\varphi,i}$) and the temperature difference sequence ($X_{\Delta\vartheta,i}$).

11. The vibronic measuring system according to claim 9,
wherein the measuring and operation electronics unit (ME) is designed to monitor, using the temperature difference sequence ($X_{\Delta\vartheta,i}$), a functionality of the transducer device, namely in particular a functionality of the first tube; and/or
wherein the measuring and operation electronics unit (ME) is designed to diagnose, using the temperature difference sequence ($X_{\Delta\vartheta,i}$), that the transducer device has a flow resistance which is changed in comparison to an original flow resistance, namely in particular that the first tube has a flow resistance which is changed in comparison to an original flow resistance; and/or
wherein the measuring and operation electronics unit (ME) is designed to generate, using the temperature difference sequence ($X_{\Delta\vartheta,i}$), an alarm which signals an only limited functionality of the transducer device, in particular as a result of a flow resistance of the first tube which is changed in comparison to an original flow resistance.

12. The vibronic measuring system according to claim 1, wherein the measuring and operation electronics unit (ME) is designed to generate, using both the first vibration signal (s1) and the second vibration signal (s2), a phase difference sequence ($x_{\Delta\varphi,i}$), namely a series of temporally successive phase difference measurement values ($x_{\Delta\varphi,i}$) respectively representing the phase difference (Δφ).

13. The vibronic measuring system according to claim 1,
wherein the first temperature sensor (71) is positioned less far from the first end (11a) of the first tube (11) than the second temperature sensor (72) from the first end (12a) of the first tube (12); and/or
wherein the second temperature sensor (72) is positioned less far from the second end (12b) of the second tube (12) than the first temperature sensor (71) from the second end (11b) of the first tube (11); and/or
wherein the first temperature sensor (71) is positioned at the same distance from the first end (11a) of the first tube (11) as the second temperature sensor (72) from the second end (12b) of the second tube (12); and/or
wherein the first temperature sensor (71) is positioned at the same distance from the second end (lib) of the first tube (11) as the second temperature sensor (72) from the first end (12a) of the first tube (12); and/or
wherein the first temperature sensor (71 is positioned at the same distance from a center of the first tube as the second temperature sensor (72); and/or
wherein the first temperature sensor and the second temperature sensor are identical in design; and/or
wherein the first temperature sensor is mechanically coupled to the wall of the first tube in the same way as the second temperature sensor; and/or
wherein the first temperature sensor (71) is positioned at the same distance from the first vibration sensor (51) as the second temperature sensor (72) from the second vibration sensor (52); and/or
wherein the transducer device has no other temperature sensor contacting the wall of the first tube than the first temperature sensor and the second temperature sensor.

14. The vibronic measuring system according to claim 1, wherein the first vibration sensor is thermally conductively coupled to the wall of the first tube in the same way as the second vibration sensor; and/or
wherein a vibration sensor arrangement formed by means of the first vibration sensor (51) and by means of the second vibration sensor (52) is mirror-symmetric with respect to at least one imaginary symmetry axis, which imaginarily intersects the transducer device, namely is in particular parallel to a main axis of inertia of the first tube.

15. The vibronic measuring system according to claim 1, wherein the first tube is mirror-symmetric with respect to at least one imaginary symmetry axis, which imaginarily intersects the tube; and/or
wherein a temperature sensor arrangement, formed by means of the first temperature sensor (71) and by means of the second temperature sensor (72), of the transducer device is axially symmetric with respect to at least one imaginary symmetry axis, which imaginarily intersects the transducer device; and/or
wherein the wall of the first tube consists at least partially of a material of which a specific thermal conductivity, $\lambda 10$, is more than 10 W/(m·K) and of which a specific heat capacity, cp1, is less than 1000 J/(kg·K); and/or
wherein the wall of the first tube (11) consists of metal; and/or
wherein the reference fluid has a specific heat capacity $(C_{p,ref})$ of more than 1 kJ·kg$^{-1}$·K$^{-1}$ and/or less than 4.2 kJ·kg$^{-1}$·K$^{-1}$; and/or
wherein the first tube (11) has a caliber (D11) which is more than 0.1 mm (millimeters); and/or
wherein an unwound tube length, $L_{11}$, of the first tube (11) is more than 300 mm.

16. The vibronic measuring system according to claim 1, further comprising: a second tube (12) which comprises a lumen (12') surrounded by a wall and which extends from an inlet-side first end (12a) to an outlet-side second end (12b) and which is designed to be flowed through by a fluid from the inlet-side first end toward the outlet-side second end and in the process is caused to vibrate.

17. The vibronic measuring system according to claim 16, further comprising: an inlet-side first flow divider ($20_1$) and an outlet-side second flow divider ($20_2$), wherein both the first and second tube (11, 12), forming fluidically parallelly connected flow paths are connected to the flow dividers ($20_1$, $20_2$) such that the first tube (11) opens with its first end (11a) into a first flow opening ($20_{1A}$) of the first flow divider ($20_1$) and with its second end (11b) into a first flow opening ($20_{2A}$) of the second flow divider ($20_2$), and that the second tube (12) opens with its first end (12a) into a second flow opening ($20_{1B}$) of the first flow divider ($20_1$) and with its second end (12b) into a second flow opening ($20_{2B}$) of the second flow divider ($20_2$).

18. The vibronic measuring system according to claim 17, wherein both the first flow divider ($20_1$) and the second flow divider ($20_2$) are respectively an integral component of the transducer housing.

19. The vibronic measuring system according to claim 1, further comprising: a transducer housing (100) which has a cavity surrounded by a wall,
wherein at least the first tube is arranged within the cavity of the transducer housing such that an intermediate space (100') is formed between an inner surface (100+), facing the cavity, of the wall of the transducer housing and a lateral surface (11 #), facing the cavity, of the wall of the first tube,
and wherein the transducer housing and the first tube are designed to hold in the intermediate space (100') a fluid (FL2) forming a fluid volume surrounding the first tube, such that the lateral surface (11 #), facing the intermediate space, of the wall of the first tube (11), forming a first interface (II11) of the first type, namely an interface between a fluid and a solid phase, is contacted.

20. The vibronic measuring system according to claim 1, further comprising:
an inlet-side first connecting flange (13)
and an outlet-side second connecting flange (14).

21. The vibronic measuring system according to claim 20, wherein each of the connecting flanges (13, 14) respectively has a sealing surface for the fluid-tight or leak-free connection of the transducer device to a respectively corresponding line segment of a process line,
and wherein a shortest distance between said sealing surfaces defines an installation length, $L_{mw}$, of the transducer device.

22. The vibronic measuring system according to claim 21, wherein a tube length to installation length ratio, $L_{11}/L_{MW}$, of the transducer device, defined by a ratio of an unwound tube length, $L_{11}$, of the first tube (11) to the installation length, $L_{11}$, of the transducer device is more than 1.2.

23. The vibronic measuring system according to claim 1, wherein the measuring and operation electronics unit (ME) comprises a multiplexer (MUX) which includes at least two signal inputs and at least one signal output and which is designed to optionally switch one of its signal inputs through to the signal output such that a signal applied to the respectively switched-through signal input is passed to the signal output;
and wherein the measuring and operation electronics unit (ME) comprises an analog-to-digital converter (ADC) with at least one signal input and at least one signal output, which analog-to-digital converter is designed to convert an analog input signal applied to said signal input with a sampling rate, $f_A$, and with a digital resolution, N, into a digital output signal representing said input signal and to provide it at the signal output.

24. The vibronic measuring system according to claim 23, wherein the at least one signal output of the multiplexer and the at least one signal input of the analog-to-digital converter are electrically coupled to each other;

and wherein the first temperature sensor (71) and the second temperature sensor (72) are respectively electrically connected to the multiplexer (MUX) such that the temperature measurement signal (θ1) is applied to a first signal input of the multiplexer (MUX) and that the temperature measurement signal (θ2) is applied to a second signal input of the multiplexer (MUX).

25. The vibronic measuring system according to claim 24, wherein the output signal of the analog-to-digital converter (ADC) temporarily represents exactly one of the two temperature measurement signals (θ1, θ2).

26. The vibronic measuring system according to claim 25, wherein the measuring and operation electronics (ME) is designed to generate the mass flow measurement value using the output signal, representing one of the two temperature measurement signals (θ1, θ2), of the analog-to-digital converter (ADC).

27. The vibronic measuring system according to claim 1, wherein the measuring and operation electronics unit (ME) is designed to generate, using both the first temperature measurement signal (θ1) and the second temperature measurement signal (θ2), a transducer temperature measurement value, which represents a transducer device temperature, which deviates both from the first measuring point temperature (ϑ1) and from the second measuring point temperature (ϑ2) such that a magnitude of said transducer temperature measurement value corresponds to an arithmetic mean of the first and second measuring point temperatures (ϑ1, ϑ2) and/or to a weighted average of the first and second measuring point temperatures (ϑ1, ϑ2) and/or represents an average tube wall temperature ($\vartheta_{11}$) of the first tube (11).

28. Use of a measuring system according to claim 1 to measure at least one physical measurement variable.

29. The vibronic measuring system according to claim 1, wherein the measuring and operation electronics unit (ME) is designed to generate, using each of the first and second vibration signals (s1, s2) as well as each of the first and second temperature measurement signals (θ1, θ2), a mass flow sequence ($X_m$), namely a series of temporally successive mass flow measurement values ($x_{m,i}$) respectively instantaneously representing the mass flow rate, m, of the fluid such that for at least one reference mass flow rate ($m_{ref}$), which is not zero although constant, temporally successively determined mass flow measurement values ($x_{m,i} \rightarrow x_{m,ref}$) deviate from each other by no more than 0.01% of said reference mass flow rate ($m_{ref}$), even in the case of various temperature differences, namely temperature differences of more than 1 K and/or less than 10 K and/or temperature differences spreading over time with a range of more than 1 K and/or temperature differences changing over time with a rate of change of more than 0.05 K/s.

30. The vibronic measuring system according to claim 1, wherein the measuring and operation electronics unit (ME) is designed to generate, using each of the first and second vibration signals (s1, s2) as well as each of the first and second temperature measurement signals (θ1, θ2), a mass flow sequence ($X_m$), namely a series of temporally successive mass flow measurement values ($x_{m,i}$) respectively instantaneously representing the mass flow rate, m, of the fluid such that mass flow measurement values ($x_{m,ref} \rightarrow x_{m,ZERO}$) representing a zero scale mark of the measuring and operation electronics unit (ME), namely mass flow measurement values temporally successively respectively determined in the case of a transducer device through which no fluid flows or respectively for a reference mass flow rate ($m_{ref}$) of zero, are less than 0.01 kg/h or deviate from each other by less than 0.01 kg/h, even in the case of various temperature differences, although temperature differences of more than 1 K and/or less than 10 K and/or temperature differences spreading over time with a range of more than 1 K and/or less than 10 K and/or temperature differences changing over time with a rate of change of more than 0.05 K/s.

* * * * *